US012686233B2

(12) United States Patent
Tateno et al.

(10) Patent No.: US 12,686,233 B2
(45) Date of Patent: Jul. 21, 2026

(54) TIRE

(71) Applicant: The Yokohama Rubber Co., LTD.,
Kanagawa (JP)

(72) Inventors: Haruka Tateno, Kanagawa (JP);
Hiraku Koda, Kanagawa (JP);
Masayuki Fujishiro, Kanagawa (JP)

(73) Assignee: The Yokohama Rubber Co., LTD.,
Tokyo (JP)

( * ) Notice: Subject to any disclaimer, the term of this
patent is extended or adjusted under 35
U.S.C. 154(b) by 26 days.

(21) Appl. No.: 18/691,336

(22) PCT Filed: Sep. 9, 2022

(86) PCT No.: PCT/JP2022/033918
§ 371 (c)(1),
(2) Date: Mar. 12, 2024

(87) PCT Pub. No.: WO2023/042764
PCT Pub. Date: Mar. 23, 2023

(65) Prior Publication Data
US 2024/0262134 A1     Aug. 8, 2024

(30) Foreign Application Priority Data

Sep. 17, 2021     (JP) ................................. 2021-152351

(51) Int. Cl.
*B60C 3/04* (2006.01)
*B60C 11/03* (2006.01)
*B60C 11/13* (2006.01)
(52) U.S. Cl.
CPC ............... *B60C 11/13* (2013.01); *B60C 3/04*
(2013.01); *B60C 11/0304* (2013.01);
(Continued)

(58) Field of Classification Search
CPC ..... B60C 3/04; B60C 11/0318; B60C 11/033;
B60C 11/0304; B60C 2011/0353; B60C
2011/0355
See application file for complete search history.

(56) References Cited

U.S. PATENT DOCUMENTS

2005/0257870 A1     11/2005  Ohsawa et al.
2016/0001603 A1*     1/2016  Kubota ............... B60C 11/0304
152/209.8

FOREIGN PATENT DOCUMENTS

CN          1684845  A      10/2005
EP          114594   A  *   8/1984
(Continued)

OTHER PUBLICATIONS

Machine translation for Japan 2018-138434 (Year: 2025).*
Machine translation for Europe 114594 (Year: 2025).*

*Primary Examiner* — Steven D Maki
(74) *Attorney, Agent, or Firm* — Thorpe North & Western

(57)     ABSTRACT

A tire includes a pair of bead cores, a carcass layer extended
across the bead cores, a belt layer disposed on an outer side
of the carcass layer in a radial direction, and a tread portion.
The tire outer diameter OD (mm) is in a range $200 \leq OD \leq 660$.
The total tire width SW (mm) is in a range $100 \leq SW \leq 400$. A
groove area ratio Aa (%) of the tread portion is in a range
$0.008 \leq Aa/OD \leq 0.150$. When a region of $48 \times (OD/SW)^{\wedge}(1/5)$
(%) from a maximum ground contact width end portion on
a tire inner side when the tire is mounted on a vehicle is
defined as a tire inner region of the tread portion, a groove
area ratio Ai (%) of the tire inner region and a groove area
ratio Ao (%) of a tire outer region as a region other than the
tire inner region have a relationship Ai<Ao.

13 Claims, 14 Drawing Sheets

(52) U.S. Cl.
CPC ........ *B60C 11/0318* (2013.01); *B60C 11/033*
(2013.01); *B60C 2011/0353* (2013.01); *B60C*
*2011/0355* (2013.01)

(56) References Cited

FOREIGN PATENT DOCUMENTS

| | | | |
|----|----------------|-------|---------|
| JP | 2014-162340 | A | 9/2014 |
| JP | 2015-189440 | A | 11/2015 |
| JP | 2016-41583 | A | 3/2016 |
| JP | 2018-138434 | A * | 9/2018 |
| JP | 2018-138435 | A | 9/2018 |
| WO | 2009/099108 | A1 | 8/2009 |
| WO | 2020/122169 | A1 | 6/2020 |

* cited by examiner

| | Comparative Example | Example 1 | Example 2 | Example 3 | Example 4 | Example 5 | Example 6 | Example 7 |
|---|---|---|---|---|---|---|---|---|
| OD (mm) | 531 | 531 | 531 | 531 | 480 | 480 | 480 | 464 |
| SW (mm) | 143 | 143 | 143 | 143 | 235 | 235 | 235 | 235 |
| TW (mm) | 123 | 123 | 123 | 123 | 211 | 211 | 211 | 211 |
| RD (mm) | 305 | 305 | 305 | 305 | 254 | 254 | 254 | 254 |
| SW/OD | 0.27 | 0.27 | 0.27 | 0.27 | 0.49 | 0.49 | 0.49 | 0.51 |
| TW/SW | 0.86 | 0.86 | 0.86 | 0.86 | 0.90 | 0.90 | 0.90 | 0.90 |
| Aa/OD | 0.006 | 0.009 | 0.049 | 0.122 | 0.01 | 0.054 | 0.135 | 0.01 |
| Ai < Ao | × | ○ | ○ | ○ | ○ | ○ | ○ | ○ |
| Ai30 | 30 | 45 | 45 | 45 | 45 | 45 | 45 | 45 |
| Ao30 | 20 | 55 | 55 | 55 | 55 | 55 | 55 | 55 |
| Ai30/Ao30 | 1.5 | 0.8 | 0.8 | 0.8 | 0.8 | 0.8 | 0.8 | 0.8 |
| Gmax | 2.3 | 2.3 | 2.3 | 2.3 | 2.3 | 2.3 | 2.3 | 2.3 |
| Ai/Ao | 1.3 | 0.09 | 0.09 | 0.09 | 0.09 | 0.09 | 0.09 | 0.09 |
| Gi/Go | 0.3 | 0.3 | 0.3 | 0.3 | 0.3 | 0.3 | 0.3 | 0.3 |
| Projected area C of circumferential main grooves (mm2) | 1519 | 1519 | 1519 | 1519 | 2256 | 2256 | 2256 | 2181 |
| Average pitch number Po | 11 | 11 | 11 | 11 | 11 | 11 | 11 | 11 |
| Pi/Po | 0.6 | 0.6 | 0.6 | 0.6 | 0.6 | 0.6 | 0.6 | 0.6 |
| Wet performance | 100 | 106 | 108 | 107 | 103 | 105 | 104 | 102 |
| Fuel economy performance | 100 | 103 | 105 | 104 | 106 | 108 | 107 | 108 |

FIG. 9

| | Example 8 | Example 9 | Example 10 | Example 11 | Example 12 | Example 13 | Example 14 | Example 15 |
|---|---|---|---|---|---|---|---|---|
| OD (mm) | 464 | 464 | 547 | 547 | 547 | 531 | 531 | 531 |
| SW (mm) | 235 | 235 | 143 | 143 | 143 | 143 | 143 | 143 |
| TW (mm) | 211 | 211 | 123 | 123 | 123 | 123 | 123 | 123 |
| RD (mm) | 254 | 254 | 305 | 305 | 305 | 305 | 305 | 305 |
| SW/OD | 0.51 | 0.51 | 0.26 | 0.26 | 0.26 | 0.27 | 0.27 | 0.27 |
| TW/SW | 0.90 | 0.90 | 0.86 | 0.86 | 0.86 | 0.86 | 0.86 | 0.86 |
| Aa/OD | 0.056 | 0.14 | 0.009 | 0.048 | 0.119 | 0.049 | 0.049 | 0.049 |
| Ai < Ao | ○ | ○ | ○ | ○ | ○ | ○ | ○ | ○ |
| Ai30 | 45 | 45 | 45 | 45 | 45 | 0.1 | 20 | 40 |
| Ao30 | 55 | 55 | 55 | 55 | 55 | 55 | 55 | 55 |
| Ai30/Ao30 | 0.8 | 0.8 | 0.8 | 0.8 | 0.8 | 0.0 | 0.4 | 0.7 |
| Gmax | 2.3 | 2.3 | 2.3 | 2.3 | 2.3 | 2.3 | 2.3 | 2.3 |
| Ai/Ao | 0.09 | 0.09 | 0.09 | 0.09 | 0.09 | 0.09 | 0.09 | 0.09 |
| Gi/Go | 0.3 | 0.3 | 0.3 | 0.3 | 0.3 | 0.3 | 0.3 | 0.3 |
| Projected area C of circumferential main grooves (mm2) | 2181 | 2181 | 1564 | 1564 | 1564 | 1519 | 1519 | 1519 |
| Average pitch number Po | 11 | 11 | 11 | 11 | 11 | 11 | 11 | 11 |
| Pi/Po | 0.6 | 0.6 | 0.6 | 0.6 | 0.6 | 0.6 | 0.6 | 0.6 |
| Wet performance | 104 | 103 | 108 | 110 | 109 | 109 | 112 | 111 |
| Fuel economy performance | 110 | 109 | 102 | 104 | 103 | 103 | 105 | 105 |

FIG. 10

| | Example 16 | Example 17 | Example 18 | Example 19 | Example 20 | Example 21 | Example 22 | Example 23 |
|---|---|---|---|---|---|---|---|---|
| OD (mm) | 531 | 531 | 531 | 531 | 531 | 531 | 531 | 531 |
| SW (mm) | 143 | 143 | 143 | 143 | 143 | 143 | 143 | 143 |
| TW (mm) | 123 | 123 | 123 | 123 | 123 | 123 | 123 | 123 |
| RD (mm) | 305 | 305 | 305 | 305 | 305 | 305 | 305 | 305 |
| SW/OD | 0.27 | 0.27 | 0.27 | 0.27 | 0.27 | 0.27 | 0.27 | 0.27 |
| TW/SW | 0.86 | 0.86 | 0.86 | 0.86 | 0.86 | 0.86 | 0.86 | 0.86 |
| Aa/OD | 0.049 | 0.049 | 0.049 | 0.049 | 0.049 | 0.049 | 0.049 | 0.049 |
| Ai < Ao | ○ | ○ | ○ | ○ | ○ | ○ | ○ | ○ |
| Ai30 | 10 | 10 | 10 | 5 | 20 | 34 | 20 | 20 |
| Ao30 | 15 | 35 | 50 | 35 | 35 | 35 | 35 | 35 |
| Ai30/Ao30 | 0.7 | 0.3 | 0.2 | 0.1 | 0.6 | 1.0 | 0.6 | 0.6 |
| Gmax | 2.3 | 2.3 | 2.3 | 2.3 | 2.3 | 2.3 | 3.2 | 10.1 |
| Ai/Ao | 0.09 | 0.09 | 0.09 | 0.09 | 0.09 | 0.09 | 0.09 | 0.09 |
| Gi/Go | 0.3 | 0.3 | 0.3 | 0.3 | 0.3 | 0.3 | 0.3 | 0.3 |
| Projected area C of circumferential main grooves (mm2) | 1519 | 1519 | 1519 | 1519 | 1519 | 1519 | 1519 | 1519 |
| Average pitch number Po | 11 | 11 | 11 | 11 | 11 | 11 | 11 | 11 |
| Pi/Po | 0.6 | 0.6 | 0.6 | 0.6 | 0.6 | 0.6 | 0.6 | 0.6 |
| Wet performance | 110 | 113 | 112 | 114 | 117 | 115 | 118 | 121 |
| Fuel economy performance | 105 | 106 | 106 | 104 | 107 | 106 | 108 | 112 |

FIG. 11

| | Example 24 | Example 25 | Example 26 | Example 27 | Example 28 | Example 29 | Example 30 | Example 31 |
|---|---|---|---|---|---|---|---|---|
| OD (mm) | 531 | 531 | 531 | 531 | 531 | 531 | 531 | 531 |
| SW (mm) | 143 | 143 | 143 | 143 | 143 | 143 | 143 | 143 |
| TW (mm) | 123 | 123 | 123 | 123 | 123 | 123 | 123 | 123 |
| RD (mm) | 305 | 305 | 305 | 305 | 305 | 305 | 305 | 305 |
| SW/OD | 0.27 | 0.27 | 0.27 | 0.27 | 0.27 | 0.27 | 0.27 | 0.27 |
| TW/SW | 0.86 | 0.86 | 0.86 | 0.86 | 0.86 | 0.86 | 0.86 | 0.86 |
| Aa/OD | 0.049 | 0.049 | 0.049 | 0.049 | 0.049 | 0.049 | 0.049 | 0.049 |
| Ai < Ao | ○ | ○ | ○ | ○ | ○ | ○ | ○ | ○ |
| Ai30 | 20 | 20 | 20 | 20 | 20 | 20 | 20 | 20 |
| Ao30 | 35 | 35 | 35 | 35 | 35 | 35 | 35 | 35 |
| Ai30/Ao30 | 0.6 | 0.6 | 0.6 | 0.6 | 0.6 | 0.6 | 0.6 | 0.6 |
| Gmax | 25.0 | 10.1 | 10.1 | 10.1 | 10.1 | 10.1 | 10.1 | 10.1 |
| Ai/Ao | 0.09 | 0.12 | 0.7 | 0.99 | 0.7 | 0.7 | 0.7 | 0.7 |
| Gi/Go | 0.3 | 0.3 | 0.3 | 0.3 | 0.4 | 0.6 | 0.9 | 1.1 |
| Projected area C of circumferential main grooves (mm2) | 1519 | 1519 | 1519 | 1519 | 1519 | 1519 | 1519 | 1519 |
| Average pitch number Po | 11 | 11 | 11 | 11 | 11 | 11 | 11 | 11 |
| Pi/Po | 0.6 | 0.6 | 0.6 | 0.6 | 0.6 | 0.6 | 0.6 | 0.6 |
| Wet performance | 119 | 122 | 123 | 122 | 124 | 125 | 126 | 127 |
| Fuel economy performance | 110 | 113 | 115 | 114 | 115 | 115 | 115 | 116 |

FIG. 12

| | Example 32 | Example 33 | Example 34 | Example 35 | Example 36 | Example 37 | Example 38 | Example 39 |
|---|---|---|---|---|---|---|---|---|
| OD (mm) | 531 | 531 | 531 | 531 | 531 | 531 | 531 | 531 |
| SW (mm) | 143 | 143 | 143 | 143 | 143 | 143 | 143 | 143 |
| TW (mm) | 123 | 123 | 123 | 123 | 123 | 123 | 123 | 123 |
| RD (mm) | 305 | 305 | 305 | 305 | 305 | 305 | 305 | 305 |
| SW/OD | 0.27 | 0.27 | 0.27 | 0.27 | 0.27 | 0.27 | 0.27 | 0.27 |
| TW/SW | 0.86 | 0.86 | 0.86 | 0.86 | 0.86 | 0.86 | 0.86 | 0.86 |
| Aa/OD | 0.049 | 0.049 | 0.049 | 0.049 | 0.049 | 0.049 | 0.049 | 0.049 |
| Ai < Ao | ○ | ○ | ○ | ○ | ○ | ○ | ○ | ○ |
| Ai30 | 20 | 20 | 20 | 20 | 20 | 20 | 20 | 20 |
| Ao30 | 35 | 35 | 35 | 35 | 35 | 35 | 35 | 35 |
| Ai30/Ao30 | 0.6 | 0.6 | 0.6 | 0.6 | 0.6 | 0.6 | 0.6 | 0.6 |
| Gmax | 10.1 | 10.1 | 10.1 | 10.1 | 10.1 | 10.1 | 10.1 | 10.1 |
| Ai/Ao | 0.7 | 0.7 | 0.7 | 0.7 | 0.7 | 0.7 | 0.7 | 0.7 |
| Gi/Go | 1.4 | 1.5 | 1.6 | 1.1 | 1.1 | 1.1 | 1.1 | 1.1 |
| Projected area C of circumferential main grooves (mm2) | 1519 | 1519 | 1519 | 2278 | 18983 | 62068 | 18983.25 | 18983.25 |
| Average pitch number Po | 11 | 11 | 11 | 11 | 11 | 11 | 3 | 5 |
| Pi/Po | 0.6 | 0.6 | 0.6 | 0.6 | 0.6 | 0.6 | 0.6 | 0.6 |
| Wet performance | 126 | 125 | 124 | 129 | 131 | 130 | 132 | 133 |
| Fuel economy performance | 116 | 116 | 116 | 117 | 118 | 118 | 118 | 119 |

FIG. 13

| | Example 40 | Example 41 | Example 42 | Example 43 | Example 44 | Example 45 |
|---|---|---|---|---|---|---|
| OD (mm) | 531 | 531 | 531 | 531 | 531 | 531 |
| SW (mm) | 143 | 143 | 143 | 143 | 143 | 143 |
| TW (mm) | 123 | 123 | 123 | 123 | 123 | 123 |
| RD (mm) | 305 | 305 | 305 | 305 | 305 | 305 |
| SW/OD | 0.27 | 0.27 | 0.27 | 0.27 | 0.27 | 0.27 |
| TW/SW | 0.86 | 0.86 | 0.86 | 0.86 | 0.86 | 0.86 |
| Aa/OD | 0.049 | 0.049 | 0.049 | 0.049 | 0.049 | 0.049 |
| Ai < Ao | ○ | ○ | ○ | ○ | ○ | ○ |
| Ai30 | 20 | 20 | 20 | 20 | 20 | 20 |
| Ao30 | 35 | 35 | 35 | 35 | 35 | 35 |
| Ai30/Ao30 | 0.6 | 0.6 | 0.6 | 0.6 | 0.6 | 0.6 |
| Gmax | 10.1 | 10.1 | 10.1 | 10.1 | 10.1 | 10.1 |
| Ai/Ao | 0.7 | 0.7 | 0.7 | 0.7 | 0.7 | 0.7 |
| Gi/Go | 1.1 | 1.1 | 1.1 | 1.1 | 1.1 | 1.1 |
| Projected area C of circumferential main grooves (mm2) | 18983.25 | 18983.25 | 18983.25 | 18983.25 | 18983.25 | 18983.25 |
| Average pitch number Po | 10 | 5 | 5 | 5 | 5 | 5 |
| Pi/Po | 0.6 | 0.7 | 1.0 | 1.2 | 1.4 | 1.5 |
| Wet performance | 132 | 134 | 135 | 137 | 136 | 135 |
| Fuel economy performance | 118 | 119 | 119 | 120 | 119 | 119 |

FIG. 14

TIRE

TECHNICAL FIELD

The technology relates to a tire and particularly relates to a tire having a small diameter that can provide wet performance and fuel economy performance in a compatible manner.

BACKGROUND ART

In recent years, there has been developed a small-diameter tire to be mounted on a vehicle in which a floor is lowered to expand a vehicle interior space. In such a small-diameter tire, since rotational inertia is small and a tire weight is also small, a reduction in transportation cost is expected. On the other hand, the small-diameter tire is required to have a high load capacity. Technology described in International Patent Publication No. WO 2020/122169 is a known tire in the related art associated with such a problem.

SUMMARY

The technology provides a tire having a small diameter that can provide wet performance and fuel economy performance in a compatible manner.

A tire according to an embodiment of the technology may include a pair of bead cores, a carcass layer, a belt layer, and a tread portion. The carcass layer may be extended across the bead cores. The belt layer may be disposed on an outer side of the carcass layer in a radial direction. A tire outer diameter OD (mm) may be in a range $200 \leq OD \leq 660$. A total tire width SW (mm) may be in a range $100 \leq SW \leq 400$. A groove area ratio Aa (%) of the tread portion may be in a range $0.008 \leq Aa/OD \leq 0.150$. When a region of $48 \times (OD/SW)^{\wedge}(1/5)$ (%) from a maximum ground contact width end portion on a tire inner side when the tire is mounted on a vehicle is defined as a tire inner region of the tread portion, a groove area ratio Ai (%) of the tire inner region and a groove area ratio Ao (%) of a tire outer region as a region other than the tire inner region may have a relationship Ai<Ao.

In the tire according to an embodiment of the technology, there is an advantage of providing wet performance and fuel economy performance of the tire in a compatible manner. Specifically, when the groove area ratio Aa (%) of the tread portion is in the range and the groove area ratio Ai (%) and the groove area ratio Ao (%) have the relationship Ai<Ao, the wet performance and the fuel economy performance of the tire are ensured.

BRIEF DESCRIPTION OF DRAWINGS

FIG. 9 is a table showing results of performance tests of tires according to embodiments of the technology.

FIG. 10 is a table showing results of performance tests of tires according to embodiments of the technology.

FIG. 11 is a table showing results of performance tests of tires according to embodiments of the technology.

FIG. 12 is a table showing results of performance tests of tires according to embodiments of the technology.

FIG. 13 is a table showing results of performance tests of tires according to embodiments of the technology.

FIG. 14 is a table showing results of performance tests of tires according to embodiments of the technology.

DETAILED DESCRIPTION

Embodiments of the technology will be described in detail below with reference to the drawings. Note that the technology is not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Tire

Figure 1:
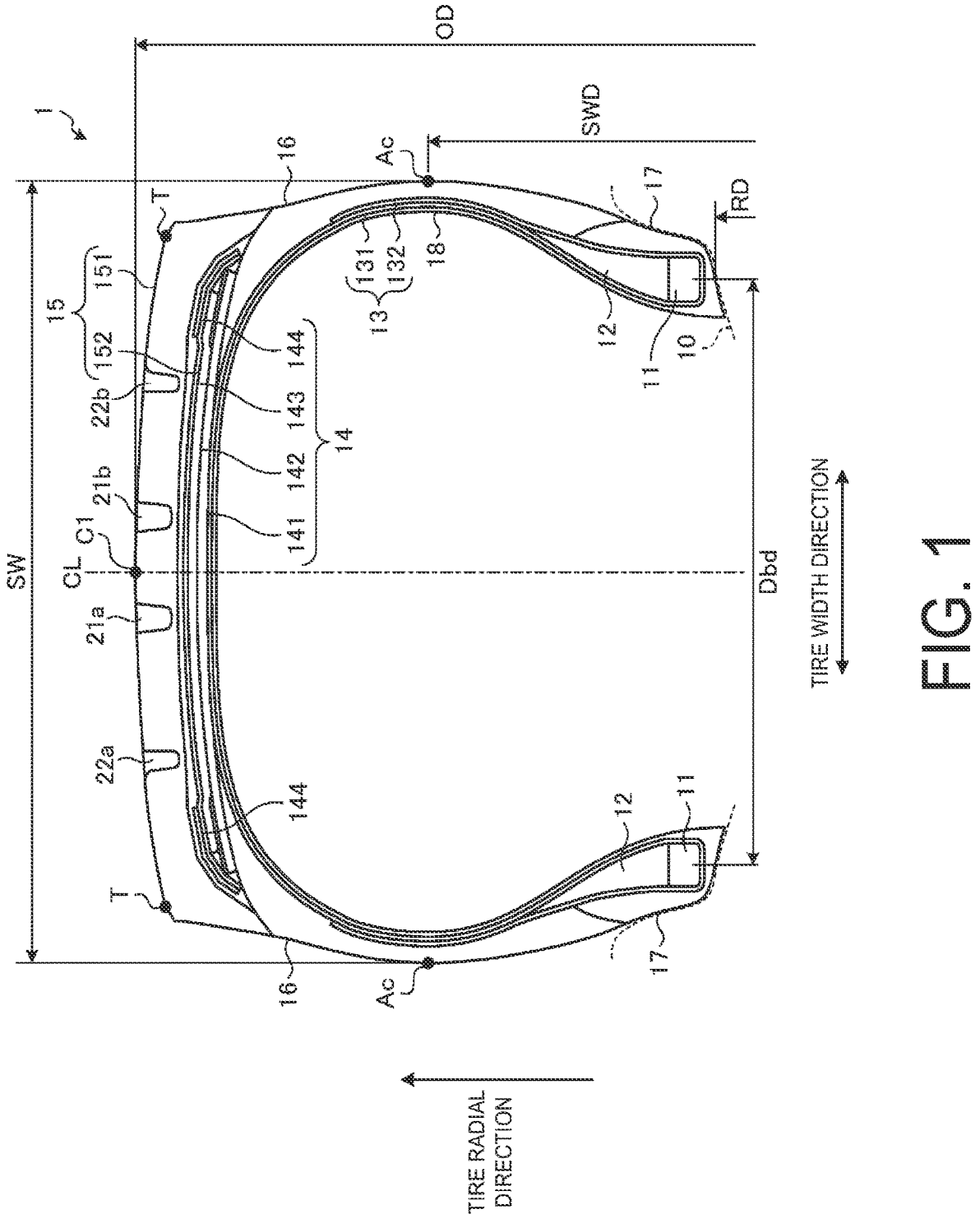
FIG. 1 is a cross-sectional view in a tire meridian direction illustrating a tire according to an embodiment of the technology.

FIG. 1 is a cross-sectional view in a tire meridian direction illustrating a tire 1 according to an embodiment of the technology. The same drawing illustrates a cross-sectional view of a half region of the tire 1 mounted on a rim in a tire radial direction. In this embodiment, a pneumatic radial tire for passenger vehicles will be described as an example of a tire.

In the same drawing, a cross-section in the tire meridian direction is defined as a cross-section of the tire taken along a plane that includes a tire rotation axis (not illustrated). Additionally, a tire equatorial plane CL is defined as a plane that passes through a midpoint of a tire cross-sectional width specified by the Japan Automobile Tyre Manufacturers Association Inc. (JATMA) and that is perpendicular to the tire rotation axis. Additionally, a tire width direction is defined as a direction parallel to the tire rotation axis, and the tire radial direction is defined as a direction perpendicular to the tire rotation axis. Additionally, a point T is a tire ground contact edge, and a point Ac is a tire maximum width position.

The tire 1 includes an annular structure with the tire rotation axis serving as the center, and includes a pair of bead cores 11, 11, a pair of bead fillers 12, 12, a carcass layer 13, a belt layer 14, a tread rubber 15, a pair of sidewall rubbers 16, 16, a pair of rim cushion rubbers 17, 17, and an innerliner 18 (see FIG. 1).

The pair of bead cores 11, 11 each include one or more of bead wires made of steel and made by being wound annularly multiple times, are embedded in bead portions, and constitute cores of the left and right bead portions. The pair of bead fillers 12, 12 are respectively disposed on an outer circumference of the pair of bead cores 11, 11 in the tire radial direction and reinforce the bead portions.

The carcass layer 13 has a single layer structure including one carcass ply or a multilayer structure including a plurality of carcass plies layered, extends in a toroidal shape between the left and right bead cores 11, 11, and constitutes the backbone of the tire. Both end portions of the carcass layer 13 are turned back toward outer sides in the tire width direction and fixed to wrap the bead cores 11 and the bead fillers 12. Moreover, the carcass ply of the carcass layer 13 is made by covering a plurality of carcass cords made of steel or an organic fiber material (for example, aramid, nylon, polyester, rayon, or the like) with a coating rubber and performing a rolling process on the carcass cords, and has a cord angle (defined as an inclination angle in a longitudinal direction of the carcass cords with respect to a tire circumferential direction) of 80 degrees or more and 100 degrees or less.

The belt layer 14 is made of a plurality of belt plies 141 to 144 being layered and is disposed around an outer circumference of the carcass layer 13. In the configuration of FIG. 1, the belt plies 141 to 144 are constituted by a pair of cross belts 141, 142, a belt cover 143, and a pair of belt edge covers 144, 144.

The pair of cross belts 141, 142 are constituted by covering a plurality of belt cords made of steel or an organic fiber material with a coating rubber and by performing a rolling process on the belt cords and have a cord angle (defined as an inclination angle in a longitudinal direction of the belt cords with respect to the tire circumferential direction) of 15 degrees or more and 55 degrees or less as an absolute value. Additionally, the pair of cross belts 141, 142 have a cord angle having mutually opposite signs and are layered by making the belt cords mutually intersect in the longitudinal direction of the belt cords (a so-called crossply structure). Furthermore, the pair of cross belts 141, 142 are disposed in a layered manner on an outer side in the tire radial direction of the carcass layer 13.

The belt cover 143 and the pair of belt edge covers 144, 144 are made by covering belt cover cords made of steel or an organic fiber material with a coating rubber and have a cord angle of 0 degrees or more and 10 degrees or less as an absolute value. Additionally, for example, a strip material is formed of one or a plurality of belt cover cords covered with coating rubber, and the belt cover 143 and the belt edge covers 144 are made by winding this strip material multiple times and in a spiral-like manner in the tire circumferential direction around outer circumferential surfaces of the cross belts 141, 142. Additionally, the belt cover 143 is disposed completely covering the cross belts 141, 142, and the pair of belt edge covers 144, 144 are disposed covering the left and right edge portions of the cross belts 141, 142 from the outer side in the tire radial direction.

The tread rubber 15 is disposed on an outer periphery in the tire radial direction of the carcass layer 13 and the belt layer 14 and constitutes a tread portion of the tire 1. Additionally, the tread rubber 15 includes a cap tread 151 and an undertread 152.

The cap tread 151 is made of a rubber material that is excellent in ground contact characteristics and weather resistance, and the cap tread 151 is exposed in a tread surface all across a tire ground contact surface, and constitutes an outer surface of the tread portion. The cap tread 151 has a rubber hardness Hs_cap of 50 or more and 80 or less, a modulus M_cap (MPa) at 100% elongation of 1.0 or more and 4.0 or less, and a loss tangent tan δ_cap of 0.03 or more and 0.36 or less and preferably the rubber hardness Hs_cap of 58 or more and 76 or less, the modulus M_cap (MPa) at 100% elongation of 1.5 or more and 3.2 or less, and the loss tangent tan δ_cap of 0.06 or more and 0.29 or less.

The rubber hardness Hs is measured in accordance with JIS (Japanese Industrial Standard) K6253 at a temperature condition of 20° C.

The modulus (breaking strength) is measured by a tensile test at a temperature of 20° C. with a dumbbell-shaped test piece in accordance with JIS K6251 (using a number 3 dumbbell).

The loss tangent tan δ is measured by using a viscoelasticity spectrometer available from Toyo Seiki Seisaku-sho Ltd. at a temperature of 60° C. a shear strain of 10%, an amplitude of ±0.5%, and a frequency of 20 Hz.

The undertread 152 is made of a rubber material excellent in heat resistance, is disposed by being sandwiched between the cap tread 151 and the belt layer 14, and constitutes a base portion of the tread rubber 15. The undertread 152 has a rubber hardness Hs_ut of 47 or more and 80 or less, a modulus M_ut (MPa) at 100% elongation of 1.4 or more and 5.5 or less, and a loss tangent tan δ_ut of 0.02 or more and 0.23 or less and preferably the rubber hardness Hs_ut of 50 or more and 65 or less, the modulus M_ut (MPa) at 100% elongation of 1.7 or more and 3.5 or less, and the loss tangent tan δ_ut of 0.03 or more and 0.10 or less.

A difference in the rubber hardness Hs_cap–Hs_ut is in the range of 3 or more and 20 or less and preferably in the range of 5 or more and 15 or less. A difference in modulus M_cap–M_ut (MPa) is in the range of 0 or more and 1.4 or less and preferably in the range of 0.1 or more and 1.0 or less. A difference in loss tangent tan δ_cap–tan δ_ut is in the range of 0 or more and 0.22 or less and preferably in the range of 0.02 or more and 0.16 or less.

The pair of sidewall rubbers 16, 16 are each disposed on an outer side of the carcass layer 13 in the tire width direction and constitute left and right sidewall portions. In the configuration of FIG. 1, the end portion of the sidewall rubber 16 on the outer side in the tire radial direction is disposed in the lower layer of the tread rubber 15 and is sandwiched between the end portion of the belt layer 14 and the carcass layer 13. However, no such limitation is intended, and the end portion of the sidewall rubber 16 on the outer side in the tire radial direction may be disposed in an outer layer of the tread rubber 15 and exposed in a buttress portion of the tire (not illustrated). In this case, a belt cushion (not illustrated) is sandwiched between the end portion of the belt layer 14 and the carcass layer 13.

The sidewall rubber 16 has a rubber hardness Hs_sw of 48 or more and 65 or less, a modulus M_sw (MPa) at 100% elongation of 1.0 or more and 2.4 or less, and a loss tangent tan δ_sw of 0.02 or more and 0.22 or less and preferably the rubber hardness Hs_sw of 50 or more and 59 or less, the modulus M_sw (MPa) at 100% elongation of 1.2 or more and 2.2 or less, and the loss tangent tan δ_sw of 0.04 or more and 0.20 or less.

The pair of rim cushion rubbers 17, 17 extend from an inner side in the tire radial direction of the left and right bead cores 11, 11 and turned back portions of the carcass layer 13 toward the outer side in the tire width direction, and constitute rim fitting surfaces of the bead portions. In the configuration of FIG. 1, an end portion on the outer side in the tire radial direction of the rim cushion rubber 17 is inserted to a lower layer of the sidewall rubber 16 and is disposed by being sandwiched between the sidewall rubber 16 and the carcass layer 13.

The innerliner 18 is an air penetration preventing layer disposed on the tire inner surface and covering the carcass layer 13, suppresses oxidation caused by exposure of the carcass layer 13, and prevents leaking of the air in the tire. Additionally, the innerliner 18 may be made of, for example, a rubber composition containing butyl rubber as a main component, or may be made of a thermoplastic resin or a thermoplastic elastomer composition containing an elastomer component blended with a thermoplastic resin or the like.

In FIG. 1, a tire outer diameter OD (mm) is in the range $200 \leq OD \leq 660$ and preferably in the range 250 mm $\leq OD \leq 580$ mm. By applying such a tire having the small diameter as a target, an effect of improving load performances described later is significantly obtained. A total tire width SW (mm) is in the range $100 \leq SW \leq 400$ and preferably in the range 105 mm $\leq SW \leq 340$ mm. In the tire 1 having the small diameter, for example, a floor of a small vehicle can be lowered to expand a vehicle interior space. Further, since rotational inertia is small and a tire weight is also small, fuel economy is improved and transportation cost is reduced. In particular, when the tire is mounted on an in-wheel motor of a vehicle, a load on a motor is effectively reduced.

The tire outer diameter OD is measured when the tire is mounted on a specified rim, inflated to a specified internal pressure, and in an unloaded state.

The total tire width SW is measured as a linear distance (including all portions such as letters and patterns on the tire side surface) between the sidewalls when the tire is mounted on a specified rim, inflated to a specified internal pressure, and in an unloaded state.

"Specified rim" refers to an "applicable rim" defined by the Japan Automobile Tire Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, the specified internal pressure refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. Additionally, the specified load refers to a "maximum load capacity" specified by JATMA, the maximum value in "TIRE LOAD LIMITS AT VARIOUS COLD INFLATION PRESSURES" specified by TRA, or "LOAD CAPACITY" specified by ETRTO. However, in the case of JATMA, for a tire for a passenger vehicle, the specified internal pressure is an air pressure of 180 kPa, and the specified load is 88% of the maximum load capacity.

The total tire width SW (mm) is in the range $0.23 \leq SW/OD \leq 0.84$ and preferably in the range $0.25 \leq SW/OD \leq 0.81$ with respect to the tire outer diameter OD (mm).

The tire outer diameter OD and the total tire width SW preferably satisfy the following mathematical formula (1). Here, A1 min=−0.0017, A2 min=0.9, A3 min=130, A1 max=−0.0019, A2 max=1.4, and A3 max=400 and preferably A1 min=−0.0018, A2 min=0.9, A3 min=160, A1 max=−0.0024, A2 max=1.6, and A3 max=362.

Mathematical Formula 1

$$A1\min * SW \wedge 2 + A2\min * SW + A3\min \leq OD \leq A1\min * SW \wedge \quad (1)$$
$$2 + A2\max * SW + A3\max$$

In the tire 1, the use of the rim 10 having a rim diameter of 5 inches or more and 16 inches or less (in other words, 125 mm or more and 407 mm or less) is assumed. A rim diameter RD (mm) is in the range $0.50 \leq RD/OD \leq 0.74$ and preferably in the range $0.52 \leq RD/OD \leq 0.71$ with respect to the tire outer diameter OD (mm). The lower limit can ensure the rim diameter RD and in particular, ensure an installation space for the in-wheel motor. The upper limit ensures an internal volume V of the tire described later and ensures the load capacity of the tire.

Note that the tire inner diameter is equal to the rim diameter RD of the rim 10.

The use of the tire 1 at an internal pressure higher than a specified internal pressure, specifically, an internal pressure of 350 kPa or more and 1200 kPa or less and preferably 500 kPa or more and 1000 kPa or less is assumed. The lower limit effectively reduces the rolling resistance of the tire, and the upper limit ensures safety of internal pressure inflation work.

The tire 1 is assumed to be mounted on a vehicle traveling at a low speed, such as a small shuttle bus. The maximum speed of the vehicle is 100 km/h or less, preferably 80 km/h or less, and more preferably 60 km/h or less. The tires 1 are assumed to be mounted on a vehicle having 6 to 12 wheels. As a result, the load capacity of the tire is appropriately exhibited.

An aspect ratio of the tire, in other words, a ratio between a tire cross-sectional height SH (mm) (see FIG. 2 described later) and a tire cross-sectional width (mm) (dimension symbols omitted in the drawings: same as the total tire width SW in FIG. 1) is in the range from 0.16 or more and 0.85 or less and preferably in the range from 0.19 or more and 0.82 or less.

The tire cross-sectional height SH is a distance equal to half of a difference between a tire outer diameter and a rim diameter, and is measured when the tire is mounted on a specified rim, inflated to a specified internal pressure, and in an unloaded state.

The tire cross-sectional width is measured as a linear distance between sidewalls (excluding patterns, letters, and the like on the tire side surface) when the tire is mounted on a specified rim, inflated to a specified internal pressure, and in an unloaded state.

In addition, a tire ground contact width TW is in the range $0.75 \leq TW/SW \leq 0.95$ and preferably in the range $0.80 \leq TW/SW \leq 0.92$ with respect to the total tire width SW.

The tire ground contact width TW is measured as a maximum linear distance in a tire axial direction in a contact surface between the tire and a flat plate when the tire is mounted on a specified rim, inflated to a specified internal pressure, placed perpendicular to the flat plate in a static state, and subjected to a load corresponding to a specified load.

The tire internal volume V (m^3) is in the range $4.0 \leq (V/OD) \times 10^6 \leq 60$ and preferably in the range $6.0 \leq (V/OD) \times 10^6 \leq 50$ with respect to the tire outer diameter OD (mm). This sets the tire internal volume V appropriate. Specifically, the lower limit ensures the tire internal volume and ensures the load capacity of the tire. In particular, since the small-diameter tire is assumed to be used under a high internal pressure and a high load, the tire internal volume V is preferably sufficiently ensured. The upper limit suppresses the increase in size of the tire caused by the excessive tire internal volume V.

The tire internal volume V (m^3) is in the range $0.5 \leq V \times RD \leq 17$ and preferably in the range $1.0 \leq V \times RD \leq 15$ with respect to the rim diameter RD (mm).

Bead Core

In FIG. 1, as described above, the pair of bead cores 11, 11 are formed by winding up one or a plurality of bead wires (not illustrated) made of steel in an annular shape and multiple times. The pair of respective bead fillers 12, 12 are disposed on an outer circumference of the pair of bead cores 11, 11 in the tire radial direction.

A tensile strength Tbd (N) of one bead core 11 is in the range $45 \leq \text{Tbd}/\text{OD} \leq 120$, preferably in the range $50 \leq \text{Tbd}/\text{OD} \leq 110$, and more preferably in the range $60 \leq \text{Tbd}/\text{OD} \leq 105$ with respect to the tire outer diameter OD (mm). The tensile strength Tbd (N) of the bead core is in the range $90 \leq \text{Tbd}/\text{SW} \leq 400$ and preferably in the range $110 \leq \text{Tbd}/\text{SW} \leq 350$ with respect to the total tire width SW (mm). As a result, the load capacity of the bead core 11 is appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the bead core.

The tensile strength Tbd (N) of the bead core 11 is calculated as a product of the tensile strength (N/piece) per bead wire and the total number of bead wires (piece) in the radial cross-sectional view. The tensile strength of the bead wire is measured by a tensile test at a temperature of 20° C. in accordance with JIS G 3510.

The tensile strength Tbd (N) of the bead core 11 preferably satisfies the following mathematical formula (2) with respect to the tire outer diameter OD (mm), a distance SWD (mm), and the rim diameter RD (mm). Here, B1 min=0.26, B2 min=10.0, B1 max=2.5, and B2 max=99.0, preferably B1 min=0.35, B2 min=14.0, B1 max=2.5, and B2 max=99.0, more preferably B1 min=0.44, B2 min=17.6, B1 max=2.5, and B2 max=99.0, and even more preferably B1 min=0.49, B2 min=17.9, B1 max=2.5, and B2 max=99.0. Further, B1 min=0.0016×P and B2 min=0.07×P are preferable with the use of a specified internal pressure P (kPa) of the tire.

Mathematical Formula 2

$$B1\min * \{(OD/2) \wedge 2 - (SWD/2) \wedge 2\} + B2\min * RD \leq \qquad (2)$$
$$Tbd \leq B1\max * \{(OD/2) \wedge 2 - (SWD/2) \wedge 2\} + B2\max * RD$$

The distance SWD is a distance twice a radial distance from the tire rotation axis (not illustrated) to a tire maximum width position Ac, in other words, a diameter of the tire maximum width position Ac and is measured when the tire is mounted on a specified rim, inflated to a specified internal pressure, and in an unloaded state.

The tire maximum width position Ac is defined as the maximum width position of the tire cross-sectional width defined by JATMA.

In a radial cross-sectional view of one bead core 11, a total cross-sectional area σbd (mm^2) of the bead wire made of the steel described above is in the range $0.025 \leq \sigma\text{bd}/\text{OD} \leq 0.075$ and preferably in the range $0.030 \leq \sigma\text{bd}/\text{OD} \leq 0.065$ with respect to the tire outer diameter OD (mm). The total cross-sectional area σbd (mm^2) of the bead wire is in the range $11 \leq \sigma\text{bd} \leq 36$ and preferably in the range $13 \leq \sigma\text{bd} \leq 33$. As a result, the above-described tensile strength Tbd (N) of the bead core 11 is achieved.

The total cross-sectional area σbd (mm^2) of the bead wire is calculated as the sum of the cross-sectional areas of the bead wires in the radial cross-sectional view of one bead core 11.

For example, in the configuration of FIG. 1, the bead core 11 has a quadrangular shape formed by arraying the bead wires (not illustrated) having a circular cross-section in a lattice shape. However, the configuration is not limited thereto, and the bead core 11 may have a hexagonal shape formed by arraying the bead wires having a circular cross-section in a closest-packed structure (not illustrated). Besides, any arrangement structure of bead wires can be employed within the scope of obviousness by one skilled in the art.

The total cross-sectional area σbd (mm^2) of the bead wire preferably satisfies the following mathematical formula (3) with respect to the tire outer diameter OD (mm), the distance SWD (mm), and the rim diameter RD (mm). Here, C min=30 and C max=8 and preferably C min=25 and C max=10.

Mathematical Formula 3

$$(OD*RD)/(Cmin*SWD) \leq \sigma bd \leq (OD*RD)/(Cmax*SWD) \qquad (3)$$

The total cross-sectional area σbd (mm^2) of the bead wire is in the range $0.50 \leq \sigma\text{bd}/\text{Nbd} \leq 1.40$ and preferably in the range $0.60 \leq \sigma\text{bd}/\text{Nbd} \leq 1.20$ with respect to the total cross-sectional area (in other words, the total number of windings) Nbd (piece) of the bead wires of one bead core 11 in the radial cross-sectional view. In other words, a cross-sectional area σbd' (mm^2) of a single bead wire is in the range 0.50 mm^2/piece or more and 1.40 mm^2/piece or less and preferably in the range 0.60 mm^2/piece or more and 1.20 mm^2/piece or less.

A maximum width Wbd (mm) (see FIG. 2 described later) of one bead core 11 in the radial cross-sectional view is in the range $0.16 \leq \text{Wbd}/\sigma\text{bd} \leq 0.50$ and preferably in the range $0.20 \leq \text{Wbd}/\sigma\text{bd} \leq 0.40$ with respect to the total cross-sectional area σbd (mm^2) of the bead wire.

In FIG. 1, a distance Dbd (mm) between the centers of gravity of the pair of bead cores 11, 11 is in the range $0.63 \leq \text{Dbd}/\text{SW} \leq 0.97$ and preferably in the range $0.65 \leq \text{Dbd}/\text{SW} \leq 0.95$ with respect to the total tire width SW (mm). The lower limit reduces an amount of deflection of the tire and reduces the rolling resistance of the tire. The upper limit reduces stress acting on the tire side portion and suppresses a tire failure.

Carcass Layer

Figure 2:
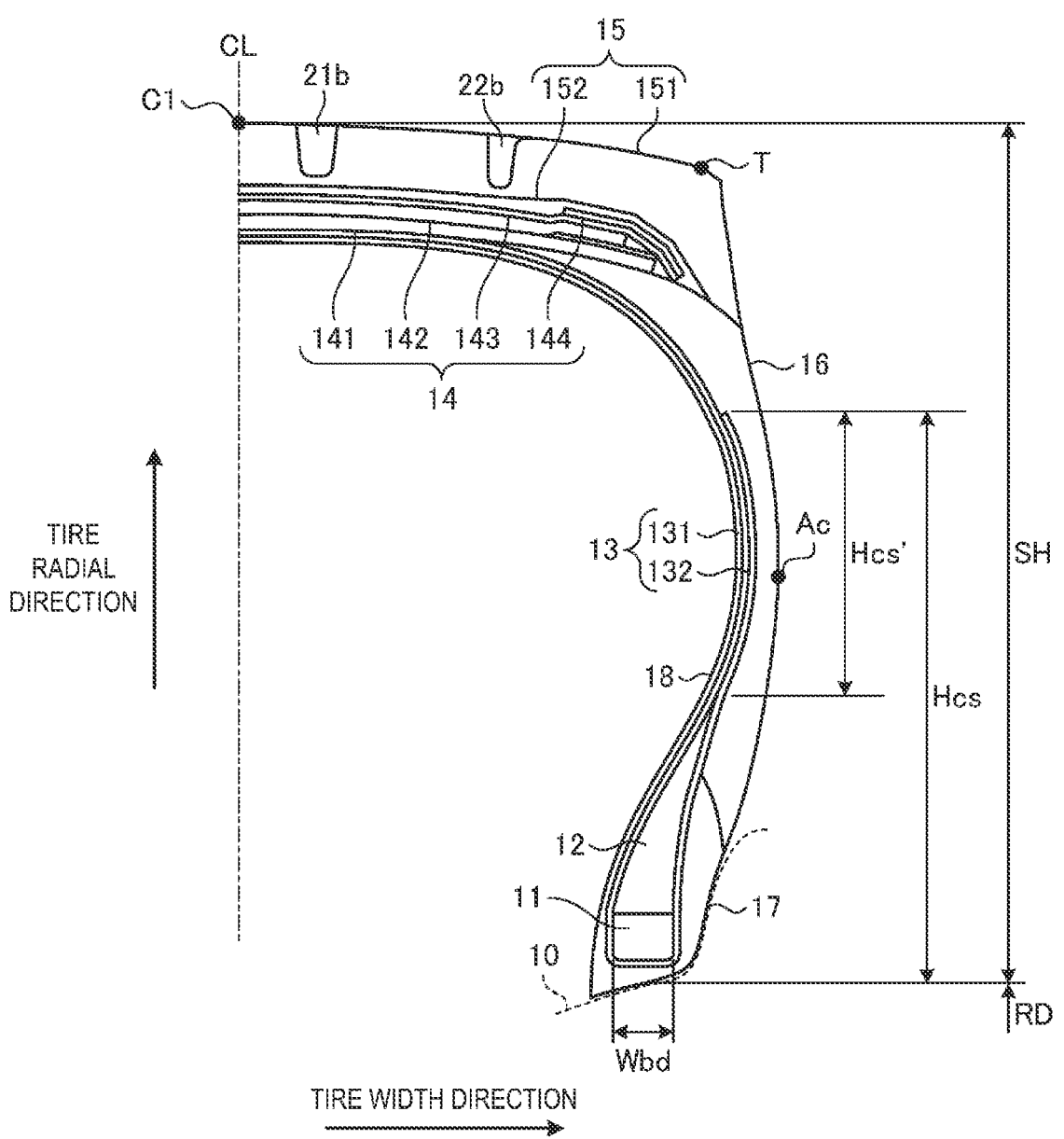
FIG. 2 is an enlarged view illustrating the tire illustrated in FIG. 1.

FIG. 2 is an enlarged view illustrating the tire 1 illustrated in FIG. 1. The same drawing illustrates the half region demarcated by the tire equatorial plane CL.

In the configuration of FIG. 1, as described above, the carcass layer 13 has a single layered carcass ply and is disposed to extend in the toroidal shape between the left and right bead cores 11, 11. Both end portions of the carcass layer 13 are turned back toward outer sides in the tire width direction and fixed to wrap the bead cores 11 and the bead fillers 12.

The tensile strength Tcs (N/50 mm) per a width of 50 mm of the carcass ply constituting the carcass layer 13 is in the range $17 \leq \text{Tcs}/\text{OD} \leq 120$ and preferably in the range $20 \leq \text{Tcs}/\text{OD} \leq 120$ with respect to the tire outer diameter OD (mm). The tensile strength Tcs (N/50 mm) of the carcass layer 13 is in the range $30 \leq \text{Tcs}/\text{SW} \leq 260$ and preferably in the range $35 \leq \text{Tcs}/\text{SW} \leq 220$ with respect to the total tire width SW (mm). As a result, the load capacity of the carcass layer 13 is appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the carcass layer.

The tensile strength Tcs (N/50 mm) of the carcass ply is calculated as follows. In other words, the carcass ply extending between the left and right bead cores 11, 11 and extending over the entire region of the tire inner circumference is defined as an effective carcass ply. The product of the tensile strength (N/piece) per carcass cord constituting the effective carcass ply and the number of insertions (piece/50 mm) of the carcass cords per the width of 50 mm on the tire equatorial plane CL over the entire circumference of the tire is calculated as the tensile strength Tcs (N/50 mm) of the carcass ply. The tensile strength of the carcass cord is measured by a tensile test at a temperature of 20° C. in accordance with JIS L 1017. For example, in a configuration in which one carcass cord is formed by intertwining, for example, a plurality of wire strands, the tensile strength of the intertwined one carcass cord is measured, and the tensile strength Tcs of the carcass layer 13 is calculated. In a configuration in which the carcass layer 13 has a multilayer structure (not illustrated) formed by layering a plurality of the effective carcass plies, the above-described tensile strength Tcs is defined for each of the plurality of effective carcass plies.

For example, in the configuration of FIG. 1, the carcass layer 13 has a single layer structure formed of a single carcass ply (reference sign omitted in drawings), and the carcass ply is configured by arraying carcass cords made of steel covered with a coating rubber at a cord angle of 80 degrees or more and 100 degrees or less with respect to the tire circumferential direction (not illustrated). The carcass cord made of the steel described above has a cord diameter φcs (mm) in the range $0.3 \leq \varphi cs \leq 1.1$ and the number of insertions Ecs (piece/50 mm) in the range $25 \leq Ecs \leq 80$, whereby the above-described tensile strength Tcs (N/50 mm) of the carcass layer 13 is achieved. The carcass cord is formed by intertwining a plurality of the wire strands, and the wire strand diameter φcss (mm) is in the range $0.12 \leq \varphi css \leq 0.24$ and preferably in the range $0.14 \leq \varphi css \leq 0.22$.

The configuration is not limited to the configuration, and the carcass ply may be constituted by a carcass cord made of an organic fiber material (for example, aramid, nylon, polyester, rayon, or the like) covered with a coating rubber. In this case, the carcass cord made of the organic fiber material has the cord diameter φcs (mm) in the range $0.6 \leq \varphi cs \leq 0.9$ and the number of insertions Ecs (piece/50 mm) in the range $40 \leq Ecs \leq 70$, whereby the above-described tensile strength Tcs (N/50 mm) of the carcass layer 13 is achieved. Besides, the carcass cord made of the high-tensile strength organic fiber material, such as nylon, aramid, and hybrid, can be employed within the scope of obviousness by one skilled in the art.

The carcass layer 13 may have a multilayer structure formed by layering a plurality of carcass plies, for example, two layers (not illustrated). Accordingly, the load capacity of the tire can be effectively enhanced.

A total tensile strength TTcs (N) of the carcass layer 13 is in the range $300 \leq TTcs/OD \leq 3500$ and preferably in the range $400 \leq TTcs/OD \leq 3000$ with respect to the tire outer diameter OD (mm). As a result, the load capacity of the entire carcass layer 13 is ensured.

The total tensile strength TTcs (N) of the carcass layer 13 is calculated as the sum of the tensile strengths Tcs (N) of the effective carcass plies described above. Therefore, the total tensile strength TTcs (N) of the carcass layer 13 increases with an increase in the tensile strength Tcs (N/50 mm) of each carcass ply, the number of layered carcass plies, a circumferential length of the carcass ply, and the like.

The total tensile strength TTcs (N) of the carcass layer 13 preferably satisfies the following mathematical formula (4) with respect to the tire outer diameter OD (mm) and the distance SWD (mm). Here, D min=2.2 and D max=40, preferably D min=4.3 and D max=40, more preferably D min=6.5 and D max=40, and even more preferably D min=8.7 and D max=40. Further, D min=0.02×P is preferable with the use of a specified internal pressure P (kPa) of the tire.

Mathematical Formula 4

$$Dmin*\{(OD/2) \wedge 2 - (SWD/2) \wedge 2\} \leq \quad (4)$$
$$TTcs \leq Dmax*\{(OD/2) \wedge 2 - (SWD/2) \wedge 2\}$$

In the configuration of FIG. 1, the carcass layer 13 includes a body portion 131 extending along the tire inner surface and a turned-up portion 132 turned up to the outer side in the tire width direction so as to wrap around the bead cores 11 and extending in the tire radial direction. In FIG. 2, a radial height Hcs (mm) from a measurement point of the rim diameter RD to an end portion of the turned-up portion 132 of the carcass layer 13 is in the range $0.49 \leq Hcs/SH \leq 0.80$ and preferably in the range $0.55 \leq Hcs/SH \leq 0.75$ with respect to the tire cross-sectional height SH (mm). Thus, the radial height Hcs of the turned-up portion 132 of the carcass layer 13 is made appropriate. Specifically, the lower limit ensures the load capacity of the tire side portion, and the upper limit suppresses the deterioration of the rolling resistance caused by the increase in the weight of the carcass layer.

The radial height Hcs (mm) of the turned-up portion 132 of the carcass layer 13 is measured when the tire is mounted on a specified rim, inflated to a specified internal pressure, and in an unloaded state.

For example, in the configuration of FIG. 2, the end portion (reference sign omitted in drawings) on the outer side of the turned-up portion 132 of the carcass layer 13 in the radial direction is in a region between the tire maximum width position Ac and an end portion (a point Au described later) of the belt layer 14, and more specifically, in a region from the tire maximum width position Ac to a radial position Au' at 70% of a distance Hu described later. At this time, a contact height Hcs' (mm) between the body portion 131 and the turned-up portion 132 of the carcass layer 13 is in the range $0.07 \leq Hcs'/SH$ and preferably in the range $0.15 \leq Hcs'/SH$ with respect to the tire cross-sectional height SH (mm). Accordingly, the load capacity of the tire side portion is effectively enhanced. The upper limit of the ratio Hcs'/SH is not particularly limited, but is restricted by the contact height Hcs' having the relationship Hcs'<Hcs with respect to the radial height Hcs of the turned-up portion 132 of the carcass layer 13.

The contact height Hcs' of the carcass layer 13 is an extension length in the tire radial direction of a region in which the body portion 131 and the turned-up portion 132 are in contact with one another and is measured when the tire is mounted on a specified rim, inflated to a specified internal pressure, and in an unloaded state.

The configuration is not limited to the configuration, and by the carcass layer 13 having a so-called low turn-up structure, the end portion of the turned-up portion 132 of the carcass layer 13 may be disposed in a region between the tire maximum width position Ac and the bead core (not illustrated).

Belt Layer

Figure 3:
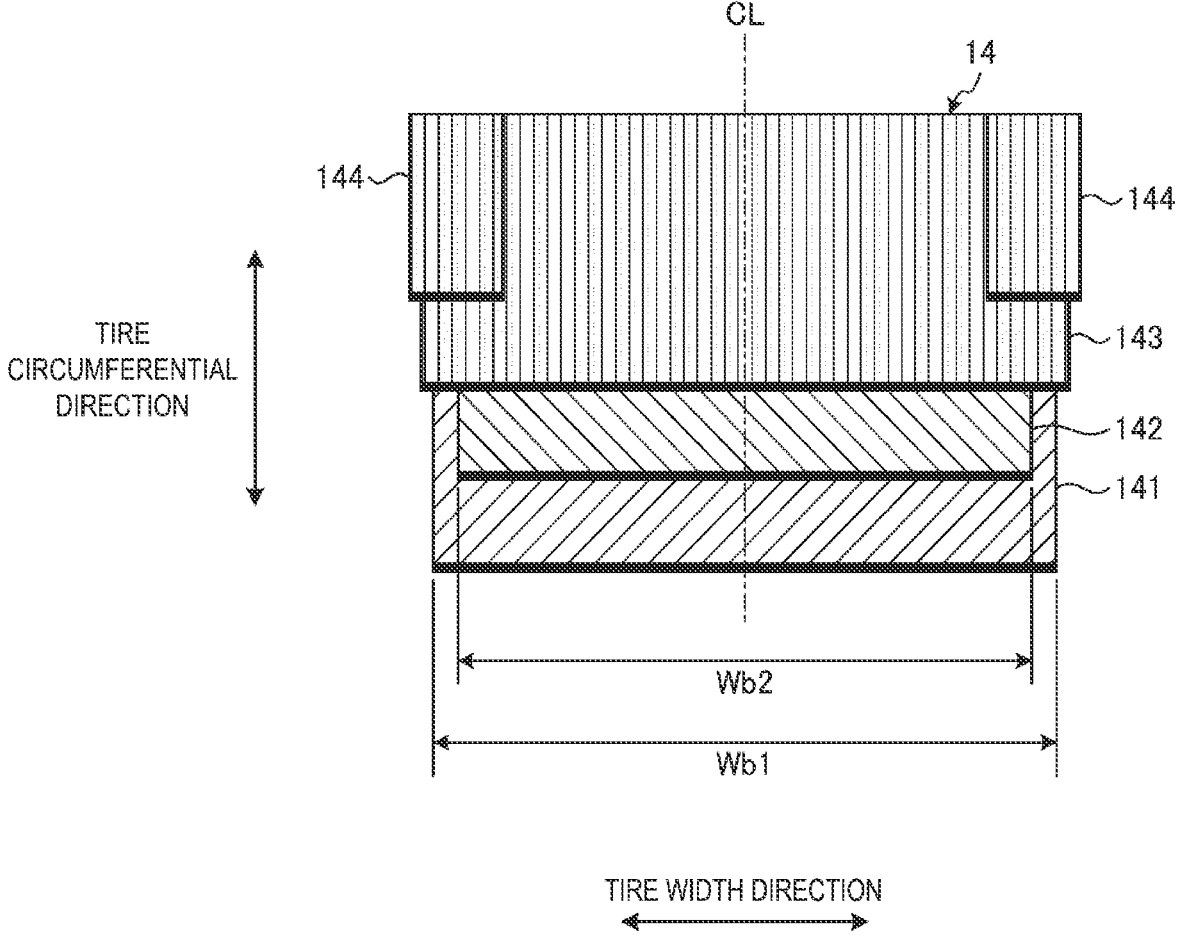
FIG. 3 is an explanatory diagram illustrating a multilayer structure of a belt layer of the tire illustrated in FIG. 1.

FIG. 3 is an explanatory diagram illustrating the multi-layer structure of the belt layer of the tire 1 illustrated in FIG. 1. In the same drawing, the thin lines given to the respective belt plies 141 to 144 schematically illustrate the arrangement configuration of the belt cords.

In the configuration of FIG. 1, as described above, the belt layer 14 is formed by layering the plurality of belt plies 141 to 144. As illustrated in FIG. 3, the belt plies 141 to 144 are constituted by the pair of cross belts 141, 142, the belt cover 143, and the pair of belt edge covers 144, 144.

At this time, the tensile strength Tbt (N/50 mm) per the width of 50 mm of each of the pair of cross belts 141, 142 is in the range $25 \leq Tbt/OD \leq 250$ and preferably in the range $30 \leq Tbt/OD \leq 230$ with respect to the tire outer diameter OD (mm). The tensile strength Tbt (N/50 mm) of the cross belts 141, 142 is in the range $45 \leq Tbt/SW \leq 500$ and preferably in the range $50 \leq Tbt/SW \leq 450$ with respect to the total tire width SW (mm). As a result, the respective load capacities of the pair of cross belts 141, 142 are appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the cross belt.

The tensile strength Tbt (N/50 mm) of the belt ply is calculated as follows. In other words, a belt ply extending over the entire region of 80% of the tire ground contact width TW centered on the tire equatorial plane CL (in other words, the central portion of the tire ground contact region) is defined as an effective belt ply. The product of the tensile strength (N/piece) per belt cord constituting the effective belt ply and the number of insertions (piece) of the belt cords per the width of 50 mm in the region of 80% of the tire ground contact width TW described above is calculated as the tensile strength Tbt (N/50 mm) of the belt ply. The tensile strength of the belt cord is measured by a tensile test at a temperature of 20° C. in accordance with JIS L 1017. For example, in a configuration in which one belt cord is formed by intertwining, for example, a plurality of wire strands, the tensile strength of the intertwined one belt cord is measured, and the tensile strength Tbt of the belt cord is calculated. In a configuration in which the belt layer 14 is formed by layering a plurality of the effective belt plies (see FIG. 1), the above-described tensile strength Tbt is defined for each of the plurality of effective belt plies. For example, in the configuration of FIG. 1, the pair of cross belts 141, 142 and the belt cover 143 correspond to the effective belt plies.

For example, in the configuration of FIG. 3, the pair of cross belts 141, 142 are configured by arraying belt cords made of steel covered with a coating rubber at a cord angle (dimension symbol omitted in the drawings) of 15 degrees or more and 55 degrees or less with respect to the tire circumferential direction. The belt cords made of the steel having the cord diameter φbt (mm) in the range $0.50 \leq \varphi bt \leq 1.80$ and the number of insertions Ebt (piece/50 mm) in the range $15 \leq Ebt \leq 60$ achieves the tensile strength Tbt (N/50 mm) of the cross belts 141, 142. The cord diameter φbt (mm) and the number of insertions Ebt (piece/50 mm) are preferably in the range $0.55 \leq \varphi bt \leq 1.60$ and $17 \leq Ebt \leq 50$ and more preferably in the range $0.60 \leq \varphi bt \leq 1.30$ and $20 \leq Ebt \leq 40$. The belt cord is formed by intertwining a plurality of the wire strands, and the wire strand diameter φbts (mm) is in the range $0.16 \leq \varphi bts \leq 0.43$ and preferably in the range $0.21 \leq \varphi bts \leq 0.39$.

The configuration is not limited to the configuration, and the cross belts 141, 142 may be constituted by belt cords made of an organic fiber material (for example, aramid, nylon, polyester, rayon, or the like) covered with a coating rubber. In this case, the belt cord made of the organic fiber material has the cord diameter φbt (mm) in the range $0.50 \leq \varphi bt \leq 0.90$ and the number of insertions Ebt (piece/50 mm) in the range $30 \leq Ebt \leq 65$, whereby the above-described tensile strength Tbt (N/50 mm) of the cross belts 141, 142 is achieved. The belt cords made of the high-tensile strength organic fiber material, such as nylon, aramid, and hybrid, can be employed within the scope of obviousness by one skilled in the art.

The belt layer 14 may include a supplemental belt (not illustrated). The supplemental belt may be, for example, (1) a third cross belt constituted by covering a plurality of belt cords made of steel or an organic fiber material with a coating rubber and performing a rolling process and having a cord angle of 15 degrees or more and 55 degrees or less as an absolute value, or (2) a so-called large-angle belt constituted by covering a plurality of belt cords made of steel or an organic fiber material with a coating rubber and performing a rolling process and having a cord angle of 45 degrees or more and 70 degrees or less as and preferably 54 degrees or more and 68 degrees or less as an absolute value. The supplemental belt may be disposed (a) between the pair of cross belts 141, 142 and the carcass layer 13, (b) between the pair of cross belts 141, 142, or (c) the outer side of the pair of cross belts 141, 142 in the radial direction (not illustrated). As a result, the load capacity of the belt layer 14 is improved.

Further, a total tensile strength TTbt (N) of the belt layer 14 is in the range $70 \leq TTbt/OD \leq 750$, preferably in the range $90 \leq TTbt/OD \leq 690$, more preferably in the range $110 \leq TTbt/OD \leq 690$, and further preferably in the range $120 \leq TTbt/OD \leq 690$ with respect to the tire outer diameter OD (mm). As a result, the load capacity of the entire belt layer 14 is ensured. Further, $0.16 \times P \leq TTbt/OD$ is preferable with the use of a specified internal pressure P (kPa) of the tire.

The total tensile strength TTbt (N) of the belt layer 14 is calculated as the sum of the tensile strengths Tbt (N/50 mm) of the effective belt plies (the pair of cross belts 141, 142 and the belt cover 143 in FIG. 1) described above. Therefore, the total tensile strength TTbt (N) of the belt layer 14 increases with an increase in the tensile strength Tbt (N/50 mm) of each belt ply, the number of layered belt plies, and the like.

Among the pair of cross belts 141, 142 (the supplemental belt is included in the configuration including the supplemental belt described above (not illustrated)), a width Wb1 (mm) of the widest cross belt (the cross belt 141 on the radially inner side in FIG. 3) is in the range $1.00 \leq Wb1/Wb2 \leq 1.40$ and preferably in the range $1.10 \leq Wb1/Wb2 \leq 1.35$ with respect to a width Wb2 (mm) of the narrowest cross belt (the cross belt 142 on the radially outer side in FIG. 3). The width Wb2 (mm) of the narrowest cross belt is in the range 0.61≤Wb2/SW≤0.96 and preferably in the range 0.70≤Wb2/SW≤0.94 with respect to the total tire width SW (mm). The lower limit ensures the width of the belt ply, properly sets a ground contact pressure distribution of the tire ground contact region, and ensures uneven wear resistance of the tire. The upper limit reduces strain of the end portion of the belt ply during rolling of the tire and suppresses separation of a peripheral rubber of the belt ply end portion.

The width of a belt ply is the distance in the direction of the tire rotation axis between the left and right end portions of each belt ply, measured when the tire is mounted on a specified rim, inflated to a specified internal pressure, and in an unloaded state.

Among the pair of cross belts 141, 142 (the supplemental belt is included in the configuration including the supplemental belt described above (not illustrated)), the width Wb1 (mm) of the widest cross belt (the cross belt 141 on the radially inner side in FIG. 3) is in the range 0.85≤Wb1/TW≤1.23 and preferably in the range 0.90≤Wb1/TW≤1.20 with respect to the tire ground contact width TW (mm).

For example, in the configurations of FIGS. 1 to 3, the wide cross belt 141 is disposed in the innermost layer in the tire radial direction, and the narrow cross belt 142 is disposed on the outer side of the wide cross belt 141 in the radial direction. The belt cover 143 is disposed on the outer side of the wide cross belt 142 in the radial direction to entirely cover both of the pair of cross belts 141, 142. The pair of belt edge covers 144, 144 are disposed on the outer side of the belt cover 143 in the radial direction while being spaced apart from one another to cover respective left and right edge portions of the pair of cross belts 141, 142.

Tread Profile and Tread Gauge

Figure 4:
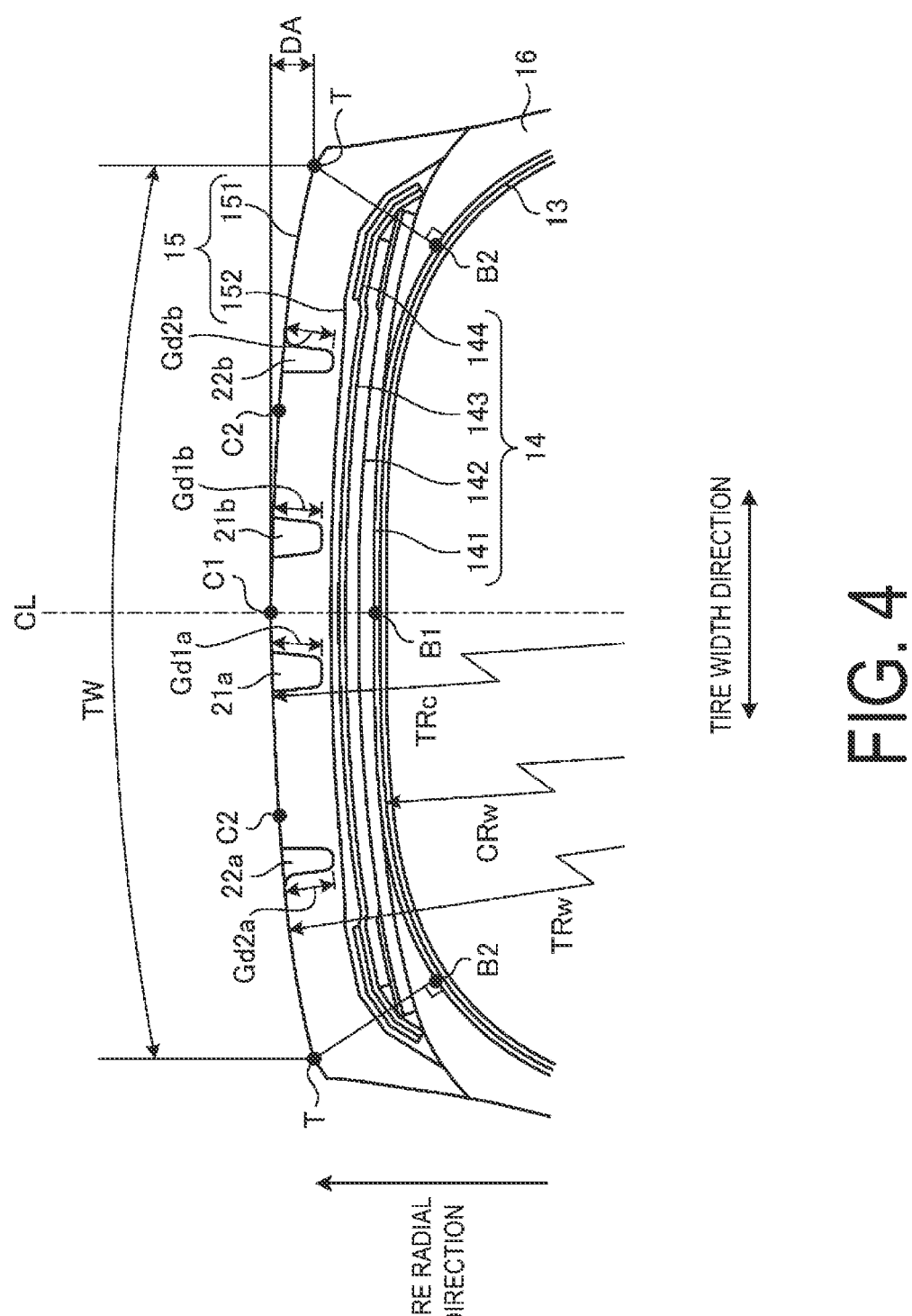
FIG. 4 is an enlarged view illustrating a tread portion of the tire illustrated in FIG. 1.

FIG. 4 is an enlarged view illustrating the tread portion of the tire 1 illustrated in FIG. 1.

In FIG. 4, an amount of depression DA (mm) of the tread profile at a tire ground contact edge T, the tire ground contact width TW (mm), and the tire outer diameter OD (mm) have the relationship 0.025≤TW/(DA×OD)≤0.400 and preferably have the relationship 0.030≤TW/(DA×OD)≤0.300. The amount of depression DA (mm) of the tread profile at the tire ground contact edge T has the relationship 0.008≤DA/TW≤0.060 and preferably has the relationship 0.013≤DA/TW≤0.050 with respect to the tire ground contact width TW (mm). As a result, a depression angle (defined by the ratio DA/(TW/2)) of a tread portion shoulder region is properly set and the load capacity of the tread portion is appropriately ensured. Specifically, the lower limit ensures the depression angle of the tread portion shoulder region and suppresses a decrease in wear life caused by an excessive ground contact pressure of the tread portion shoulder region. The upper limit flattens the tire ground contact region, uniforms the ground contact pressure, and ensures the wear resistance performance of the tire. In particular, since the small-diameter tire is assumed to be used under a high internal pressure and a high load, the ground contact pressure distribution in the tire ground contact region can be effectively properly set by the configuration.

The amount of depression DA is the distance in the tire radial direction from the intersection point CI between the tire equatorial plane CL and the tread profile in the cross-sectional view in the tire meridian direction to the tire ground contact edge T, and is measured when the tire is mounted on a specified rim, inflated to a specified internal pressure, and in an unloaded state.

The tire profile is a contour line of the tire in a cross-sectional view along the tire meridian direction, and is measured using a laser profiler. The laser profiler used may be, for example, a tire profile measuring device (available from Matsuo Co., Ltd.).

The amount of depression DA (mm) of the tread profile at the tire ground contact edge T preferably satisfies the following mathematical formula (5) with respect to the tire outer diameter OD (mm) and the total tire width SW (mm). Here, E min=3.5 and E max=17, preferably E min=3.8 and E max=13, and more preferably E min=4.0 and E max=9.

Mathematical Formula 5

$$Emin*(SW/OD) \wedge (1/4) \le DA \le Emax*(SW/OD) \wedge (1/4) \qquad (5)$$

FIG. 4 defines the point C1 on the tread profile on the tire equatorial plane CL and a pair of points C2, C2 on the tread profile at a distance of ¼ of the tire ground contact width TW from the tire equatorial plane CL.

At this time, a radius of curvature TRc (mm) of an arc passing through the point C1 and the pair of points C2 is in the range 0.15≤TRc/OD≤15 and preferably in the range 0.18≤TRc/OD≤12 with respect to the tire outer diameter OD (mm). The radius of curvature TRc (mm) of the arc is in the range 30≤TRc≤3000, preferably in the range 50≤TRc≤2800, and more preferably in the range 80≤TRc≤2500. As a result, the load capacity of the tread portion is appropriately ensured. Specifically, the lower limit flattens the tread portion center region, uniforms the ground contact pressure of the tire ground contact region, and ensures the wear resistance performance of the tire. The upper limit suppresses a decrease in wear life caused by an excessive ground contact pressure of the tread portion shoulder region. In particular, since the small-diameter tire is assumed to be used under a high internal pressure and a high load, a uniform effect of the ground contact pressure under such a use condition can be effectively obtained.

The radius of curvature of the arc is measured when the tire is mounted on a specified rim, inflated to a specified internal pressure, and in an unloaded state.

In FIG. 4, a radius of curvature TRw (mm) of an arc passing through the point C1 of the tire equatorial plane CL and the left and right tire ground contact edges T, T described above is in the range 0.30≤TRw/OD≤16 and preferably in the range 0.35≤TRw/OD≤11 with respect to the tire outer diameter OD (mm). The radius of curvature TRw (mm) of the arc is in the range 150≤TRw≤2800 and preferably in the range 200≤TRw≤2500. As a result, the load capacity of the tread portion is appropriately ensured. Specifically, the lower limit flattens the entire tire ground contact region, uniforms the ground contact pressure, and ensures the wear resistance performance of the tire. The upper limit suppresses a decrease in wear life caused by an excessive ground contact pressure of the tread portion shoulder region. In particular, since the small-diameter tire is assumed to be used under a high internal pressure and a high load, the ground contact pressure distribution in the tire ground contact region can be effectively properly set by the configuration.

The radius of curvature TRw (mm) of a first arc passing through the points C1 and C2 described above is in the range 0.50≤TRw/TRc≤1.00, preferably in the range 0.60≤TRw/TRc≤0.95, and more preferably in the range 0.70≤TRw/TRc≤0.90 with respect to the radius of curvature TRw (mm)

of a second arc passing through the point C and the tire ground contact edge T. This sets a contact patch shape of the tire appropriate. Specifically, the lower limit disperses the ground contact pressure of the tread portion center region and improves the wear life of the tire. The upper limit suppresses a decrease in wear life caused by an excessive ground contact pressure of the tread portion shoulder region.

In FIG. 4, a point B1 on the carcass layer 13 on the tire equatorial plane CL and feet B2, B2 of perpendicular lines extending from the left and right tire ground contact edges T, T to the carcass layer 13 are defined.

At this time, a radius of curvature CRw of an arc passing through the point B1 and the pair of points B2 and B2 is in the range 0.35≤CRw/TRw≤1.10, preferably in the range 0.40≤CRw/TRw≤1.00, and more preferably in the range 0.45≤CRw/TRw≤0.92 with respect to the radius of curvature TRw of the arc passing through the point C1 and the tire ground contact edges T and T described above. The radius of curvature CRw (mm) is in the range 100≤CRw≤2500 and preferably in the range 120≤CRw≤2200. This sets the contact patch shape of the tire more appropriate. Specifically, the lower limit suppresses a decrease in wear life caused by an increase in rubber gauge in the tread portion shoulder region. The upper limit ensures the wear life in the tread portion center region.

Figure 5:
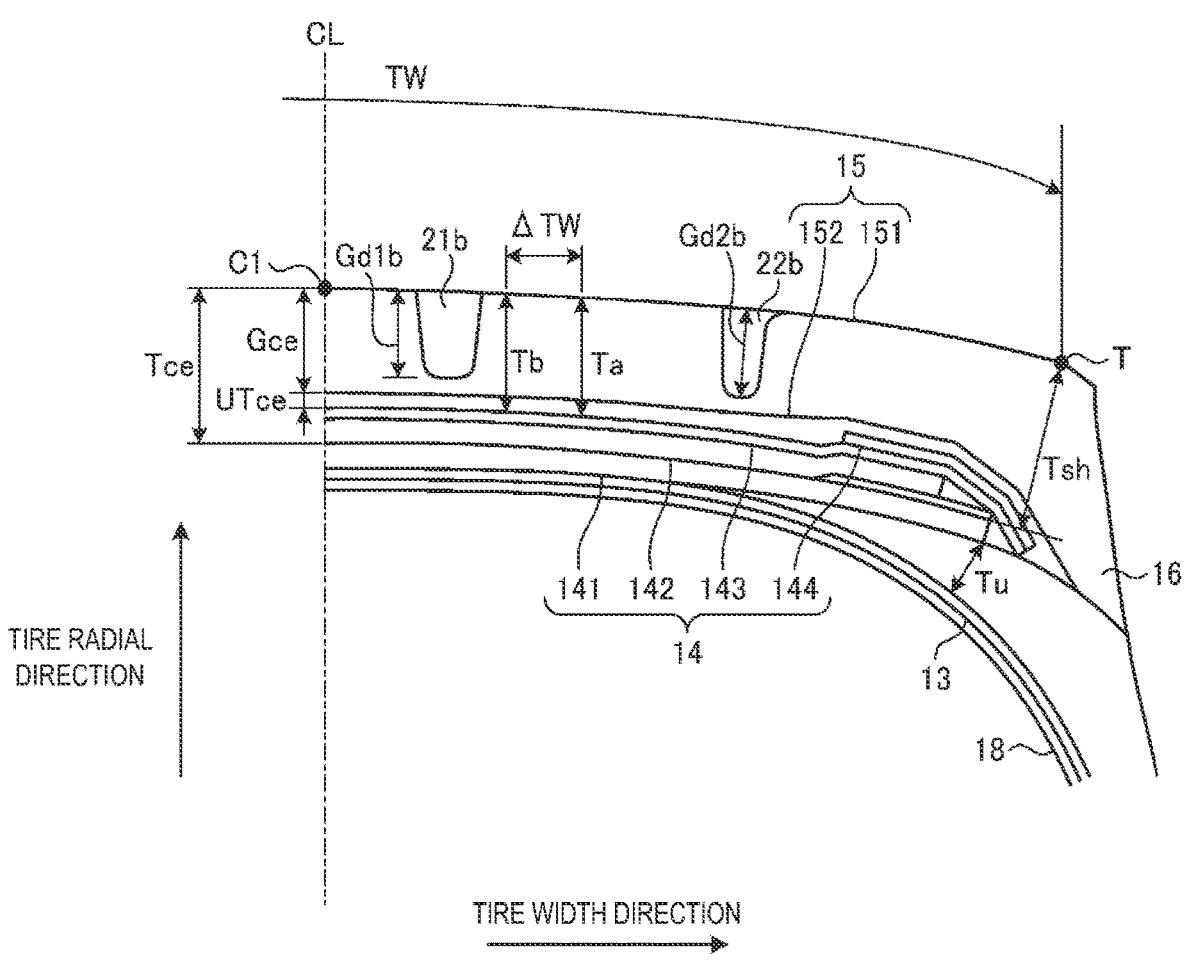
FIG. 5 is an enlarged view illustrating a half region of the tread portion illustrated in FIG. 4.

FIG. 5 is an enlarged view illustrating the half region of the tread portion illustrated in FIG. 4.

In the configuration of FIG. 1, as described above, the belt layer 14 includes the pair of cross belts 141, 142 and the tread rubber 15 includes the cap tread 151 and the undertread 152.

In FIG. 5, a distance Tce (mm) from the tread profile on the tire equatorial plane CL to the outer circumferential surface of the wide cross belt 141 has the relationship 0.008≤Tce/OD≤0.13, preferably has the relationship 0.012≤Tce/OD≤0.10, and more preferably has the relationship 0.015≤Tce/OD≤0.07 with respect to the tire outer diameter OD (mm). A distance Tce (mm) is in the range 5≤Tce≤25 and preferably in the range 7≤Tce≤20. As a result, the load capacity of the tread portion is appropriately ensured. Specifically, the lower limit suppresses tire deformation during use under a high load and ensures the wear resistance performance of the tire. In particular, since the small-diameter tire is assumed to be used under a high internal pressure and a high load, the above-described wear resistance performance is significantly obtained. The upper limit suppresses the deterioration of the rolling resistance caused by the increase in the weight of the tread rubber.

The distance Tce is measured when the tire is mounted on a specified rim, inflated to a specified internal pressure, and in an unloaded state.

The outer circumferential surface of the belt ply is defined as a circumferential surface on the outer side in the radial direction of the entire belt ply formed of the belt cords and the coating rubber.

The distance Tce (mm) from the tread profile on the tire equatorial plane CL to the outer circumferential surface of the wide cross belt 141 preferably satisfies the following mathematical formula (6) with respect to the tire outer diameter OD (mm). Here, F min=35 and F max=207 and preferably F min=42 and F max=202.

Mathematical Formula 6

$$Fmin/(OD) \wedge (1/3) \leq Tce \leq Fmax/(OD) \wedge (1/3) \qquad (6)$$

A distance Tsh (mm) from the tread profile at the tire ground contact edge T to the outer circumferential surface of the wide cross belt 141 is in the range 0.60≤Tsh/Tce≤1.70, preferably in the range 1.01≤Tsh/Tce≤1.55, and more preferably in the range 1.10≤Tsh/Tce≤1.50 with respect to the distance Tce (mm) in the tire equatorial plane CL. The lower limit ensures the tread gauge in the shoulder region, and therefore repeated deformation of the tire during rolling of the tire is suppressed, and the wear resistance performance of the tire is ensured. The upper limit ensures the tread gauge in the center region, and therefore the tire deformation during use under a high load peculiar to the small-diameter tire is suppressed, and the wear resistance performance of the tire is ensured.

The distance Tsh is measured when the tire is mounted on a specified rim, inflated to a specified internal pressure, and in an unloaded state. When a wide cross belt is not present immediately below the tire ground contact edge T, the distance is measured as a distance of an imaginary line of the distance Tsh extending from the outer circumferential surface of the belt ply from the tread profile.

The distance Tsh (mm) from the tread profile to the outer circumferential surface of the wide cross belt 141 in the tire ground contact edge T preferably satisfies the following mathematical formula (7) with respect to the distance Tce (mm) in the tire equatorial plane CL. Here, G min=0.36 and G max=0.72, preferably G min=0.37 and G max=0.71, and more preferably G min=0.38 and G max=0.70.

Mathematical Formula 7

$$Gmin*(OD) \wedge (1/7) \leq Tsh/Tce \leq Gmax*(OD) \wedge (1/7) \qquad (7)$$

In FIG. 5, a section having a width ΔTW of 10% of the tire ground contact width TW is defined. At this time, a ratio between a maximum value Ta and a minimum value Tb of the rubber gauge of the tread rubber 15 in any section in the tire ground contact region is in the range of 0% or more and 40% or less and preferably in the range 0% or more and 20% or less. In such a configuration, since an amount of change in the rubber gauge of the tread rubber 15 in any section in the tire ground contact region (in particular, a section including the end portions of the belt plies 141 to 144) is set to be small, the ground contact pressure distribution in the tire width direction smoothens and the wear resistance performance of the tire is improved.

The rubber gauge of the tread rubber 15 is defined as a distance from the tread profile to the inner circumferential surface of the tread rubber 15 (in FIG. 5, a distance from the outer circumferential surface of the cap tread 151 to the inner circumferential surface of the undertread 152). Therefore, the rubber gauge of the tread rubber 15 is measured with a groove formed in a tread contact surface excluded.

In FIG. 5, a rubber gauge UTce of the undertread 152 at the tire equatorial plane CL is in the range 0.04≤UTce/Tce≤0.60 and preferably in the range 0.06≤UTce/Tce≤0.50 with respect to the distance Tce in the tire equatorial plane CL described above. Thus, the rubber gauge UTce of the undertread 152 is properly set.

The above-described distance Tsh in the tire ground contact edge T is in the range 1.50≤Tsh/Tu≤6.90 and preferably in the range 2.00≤Tsh/Tu≤6.50 with respect to a rubber gauge Tu (mm) from the end portion of the wide cross belt 141 to the outer circumferential surface of the carcass layer 13. As a result, the profile of the carcass layer 13 is properly set and tension of the carcass layer 13 is properly set. Specifically, the lower limit ensures the tension of the carcass layer and the tread gauge in the shoulder region, and therefore repeated deformation of the tire during rolling of the tire is suppressed, and the wear resistance performance of the tire is ensured. The upper limit ensures the rubber gauge at or near the end portion of the belt ply, and therefore separation of the peripheral rubber of the belt ply is suppressed.

The rubber gauge Tu is measured as a gauge of rubber members (the sidewall rubbers 16 in FIG. 5) inserted between the end portion of the wide cross belt 141 and the carcass layer 13. Specifically, in the cross-sectional view in the tire meridian direction, a perpendicular line drawn from the end portion of the wide cross belt 141 to the outer surface of the carcass layer 13 is constructed, and a total gauge of the rubber members on the perpendicular line is calculated as the rubber gauge Tu.

The outer circumferential surface of the carcass layer 13 is defined as a circumferential surface on the outer side in the radial direction of the entire carcass ply formed of the carcass cords and the coating rubber. When the carcass layer 13 has a multilayer structure formed of a plurality of carcass plies (not illustrated), the outer circumferential surface of the carcass ply of the outermost layer constitutes the outer circumferential surface of the carcass layer 13. When the turned-up portion 132 (see FIG. 1) of the carcass layer 13 is present between the end portion of the wide cross belt 141 and the carcass layer 13 (not illustrated), the outer circumferential surface of the turned-up portion 132 constitutes the outer circumferential surface of the carcass layer 13.

For example, in the configuration of FIG. 5, the sidewall rubber 16 is inserted between the end portion of the wide cross belt 141 and the carcass layer 13 to form the rubber gauge Tu between the end portion of the wide cross belt 141 and the carcass layer 13. However, the configuration is not limited to this, and, for example, a belt cushion may be inserted between the end portion of the wide cross belt 141 and the carcass layer 13 instead of the sidewall rubber 16 (not illustrated). The inserted rubber member has a rubber hardness Hs_sp of 46 or more and 67 or less, a modulus M_sp (MPa) at 100% elongation of 1.0 or more and 3.5 or less, and a loss tangent tan δ_sp of 0.02 or more and 0.22 or less and preferably has the rubber hardness Hs_sp of 48 or more and 63 or less, the modulus M_sp (MPa) at 100% elongation of 1.2 or more and 3.2 or less, and a loss tangent tan δ_sp of 0.04 or more and 0.20 or less.

In the configuration of FIG. 1, the tire 1 includes, in the tread surface: a plurality of circumferential main grooves 21a, 21b, 22a, and 22b (see FIG. 4) extending in the tire circumferential direction and land portions (reference sign omitted in drawings) defined by the circumferential main grooves 21a, 21b, 22a, and 22b. "Main groove" refers to a groove having a wear indicator as specified by JATMA mandatorily provided.

At this time, a groove depth Gd1a (mm) of the circumferential main groove 21a closest to the tire equatorial plane CL among the plurality of circumferential main grooves 21a, 21b, 22a, and 22b is in the range 0.50≤Gd1a/Gce≤1.00 and preferably in the range 0.55≤Gd1a/Gce≤0.98 with respect to a rubber gauge Gce (mm) of the tread rubber 15. Thus, the wear resistance performance of the tire is ensured. Specifically, the lower limit disperses the ground contact pressure of the tread portion center region and improves the wear life of the tire. The upper limit ensures the rigidity of the land portion and ensures the rubber gauge from the groove bottoms of the circumferential main grooves 21a, 21b, 22a, and 22b to the belt layer.

The circumferential main groove closest to the tire equatorial plane CL is defined as the circumferential main groove on the tire equatorial plane CL (not illustrated). When the circumferential main groove is absent on the tire equatorial plane CL (see FIG. 4), the circumferential main groove closest to the tire equatorial plane CL is defined as the circumferential main groove 21a.

The ratio Gd1a/Gce described above preferably satisfies the following mathematical formula (8) with respect to the tire outer diameter OD (mm). Here, H min=0.10 and H max=0.60, preferably H min=0.12 and H max=0.50, and more preferably H min=0.14 and H max=0.40.

Mathematical Formula 8

$$H\min * 250 / OD \le Gd1a / Gce \le H\max * 250 / OD \tag{8}$$

The groove depth Gd1a (mm) of the circumferential main groove 21a closest to the tire equatorial plane CL among the plurality of circumferential main grooves 21a, 21b, 22a, and 22b is a depth equal to or more than groove depths Gd1b (mm), Gd2a (mm), Gd2b (mm) of the other circumferential main grooves 21b, 22a, and 22b (Gd1b≤Gd1a, Gd2a≤Gd1a, Gd2b≤Gd1a). Specifically, when a region from the tire equatorial plane CL to the tire ground contact edge T is bisected in the tire width direction, the groove depth Gd1a of the circumferential main groove 21a closest to the tire equatorial plane CL is in the range of 1.00 times or more and 2.50 times or less, preferably in the range of 1.00 times or more and 2.00 times or less, and more preferably in the range of 1.00 times or more and 1.80 times or less with respect to the maximum values of the groove depths Gd1b, Gd2a, Gd2b of the other circumferential main groove 21b and the other circumferential main grooves 22a, 22b in the region on the tire ground contact edge T side. The lower limit disperses the ground contact pressure of the tread portion center region and improves the wear resistance performance of the tire. The upper limit suppresses uneven wear caused by the excessively ground contact pressure difference between the tread portion center region and the shoulder region.

Side Profile and Side Gauge

Figure 6:
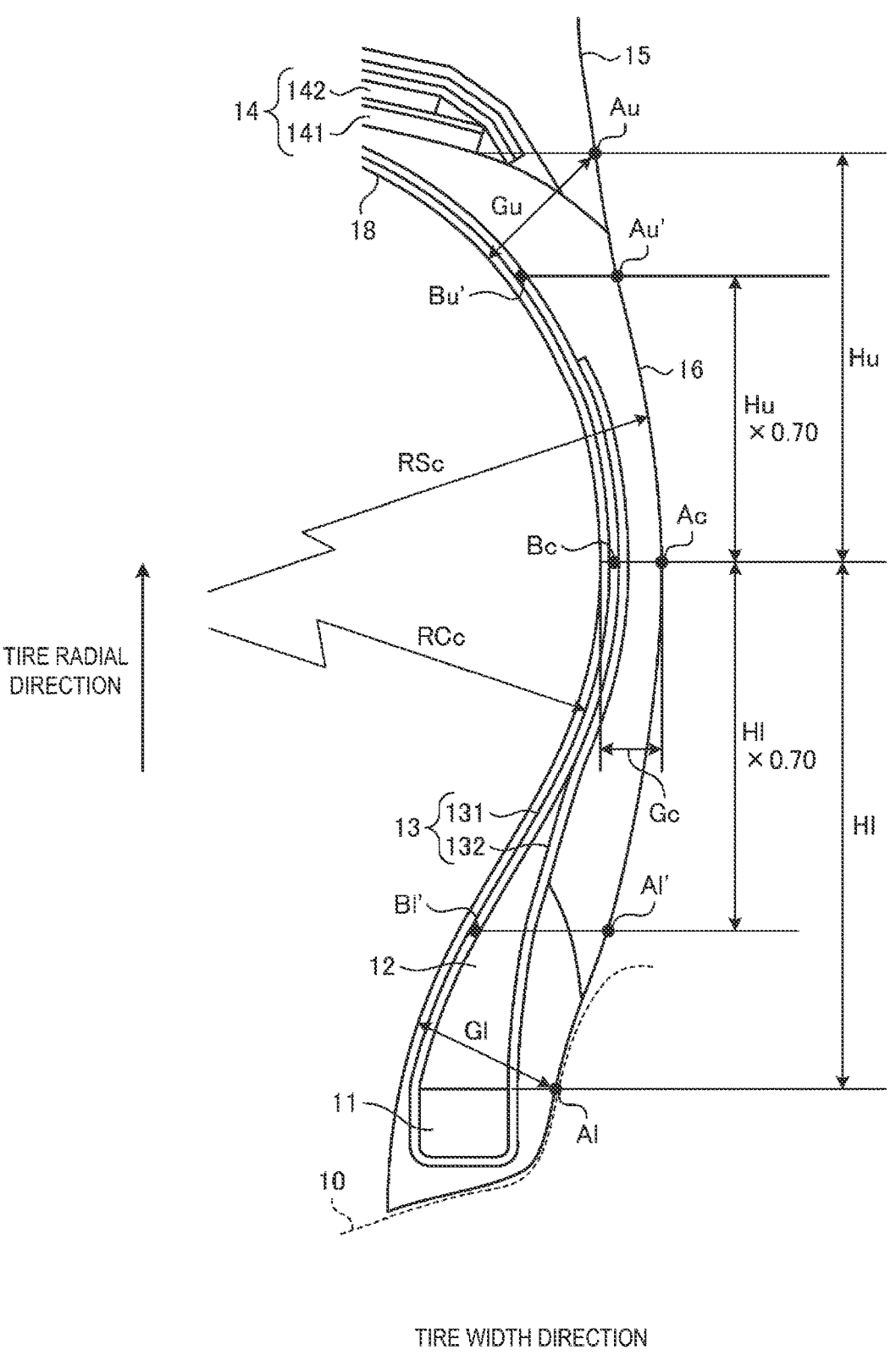
FIG. 6 is an enlarged view illustrating a sidewall portion and a bead portion of the tire illustrated in FIG. 1.
Figure 7:
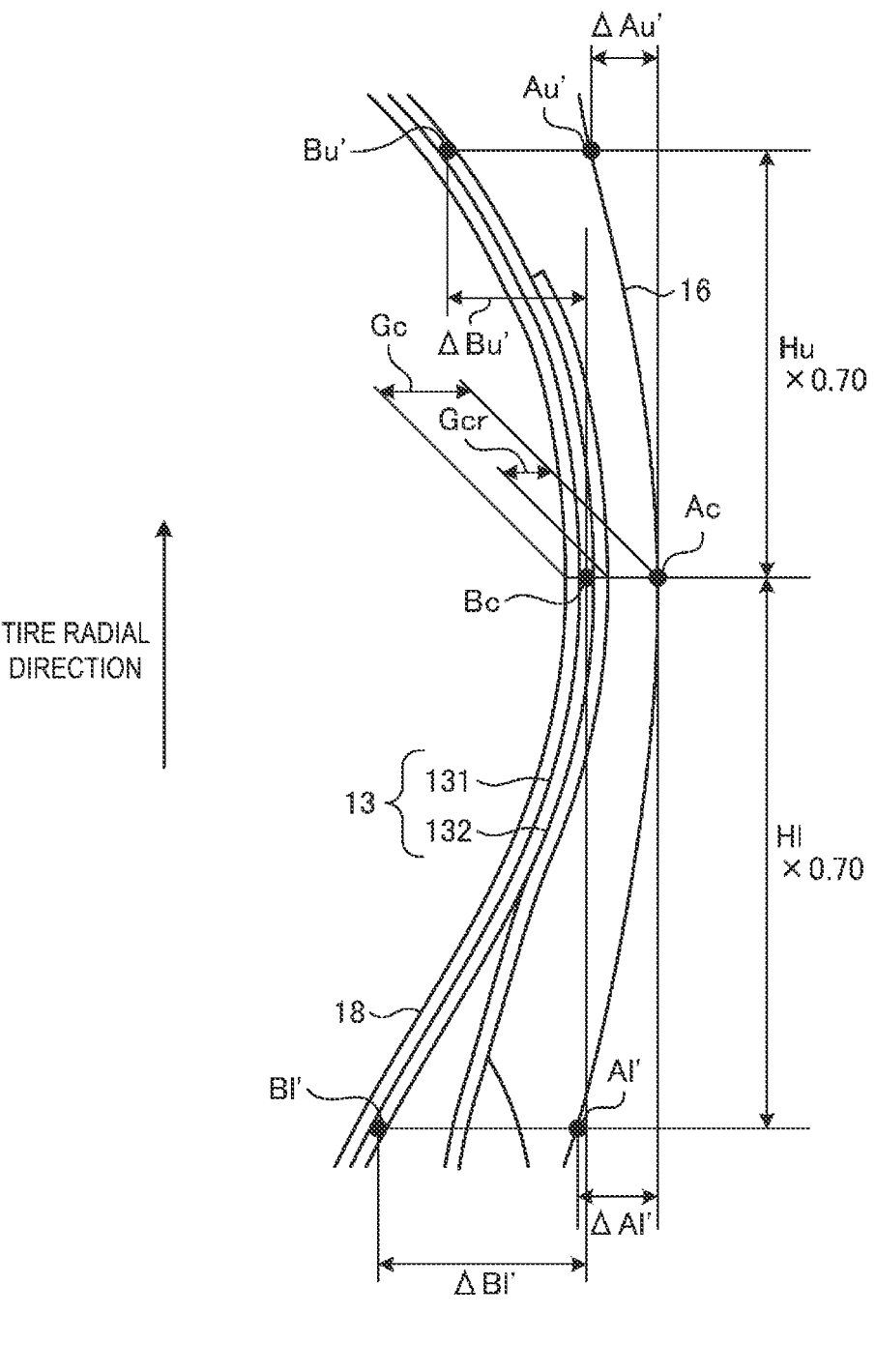
FIG. 7 is an enlarged view illustrating the sidewall portion illustrated in FIG. 6.

FIG. 6 is an enlarged view illustrating the sidewall portion and the bead portion of the tire 1 illustrated in FIG. 1. FIG. 7 is an enlarged view illustrating the sidewall portion illustrated in FIG. 6.

In FIG. 6, the point Au on the side profile at the same position as the end portion of the innermost layer of the belt layer 14 (in FIG. 6, the cross belt 141 on the radially inner side) in the tire radial direction and a point Al on the side profile at the same position as the end portion on the outer side in the radial direction of the bead core 11 in the tire radial direction are defined. The distance Hu from the tire maximum width position Ac to the point Au in the tire radial direction and a distance Hl from the tire maximum width position Ac to the point Al in the tire radial direction are defined. The point Au' on the side profile at a radial position of 70% of the distance Hu from the tire maximum width position Ac and a point Al' on the side profile at a radial position of 70% of the distance Hl from the tire maximum width position Ac are defined.

At this time, the sum of the distance Hu (mm) and the distance Hl (mm) is in the range 0.45≤(Hu+Hl)/SH≤0.90 and preferably in the range 0.50≤(Hu+Hl)/SH≤0.85 with respect to the tire cross-sectional height SH (mm) (see FIG. 2). In this way, the redial distance from the belt layer 14 to the bead core 11 is appropriately set. Specifically, the lower limit ensures a deformable region of the tire side portion and suppresses a failure of the tire side portion (for example, separation of the rubber member at the end portion on the outer side of the bead filler 12 in the radial direction). The upper limit reduces the amount of deflection of the tire side portion during rolling of the tire and reduces the rolling resistance of the tire.

The distance Hu and the distance Hl are measured when the tire is mounted on a specified rim, inflated to a specified internal pressure, and in an unloaded state.

The sum of the distance Hu (mm) and the distance Hl (mm) preferably satisfies the following mathematical formula (9) with respect to tire outer diameter OD (FIG. 1), the tire cross-sectional height SH (mm) (see FIG. 2), and a radius of curvature RSc (mm) of an arc passing through the tire maximum width position Ac, the point Au', and the point Al'. Here, I1 min=0.06, I1 max=0.20, and I2=0.70 and preferably I1 min=0.09, I1 max=0.20, and I2=0.65.

Mathematical Formula 9

$$I1\min*(OD/RSc)\wedge(1/2)\leq (Hu+Hl)/SH\leq I2+I1\max*(RSc/OD)\wedge(1/2) \quad (9)$$

The radius of curvature RSc of the arc is measured when the tire is mounted on a specified rim, inflated to a specified internal pressure, and in an unloaded state.

The distance Hu (mm) and the distance Hl (mm) have the relationship 0.30≤Hu/(Hu+Hl)≤0.70 and preferably have the relationship 0.35≤Hu/(Hu+Hl)≤0.65. Accordingly, the position of the tire maximum width position Ac in the deformable region of the tire side portion is properly set. Specifically, the lower limit alleviates stress concentration at or near the end portion of the belt ply caused by the tire maximum width position Ac being excessively close to the end portion of the belt layer 14 and suppresses the separation of the peripheral rubber. The upper limit alleviates stress concentration at or near the bead portion caused by the tire maximum width position Ac being excessively close to the end portion of the bead core 11 and suppresses a failure of a reinforcing member (the bead filler 12 in FIG. 6) of the bead portion.

The radius of curvature RSc (mm) of the arc passing through the tire maximum width position Ac, the point Au', and the point Al' is in the range 0.05≤RSc/OD≤1.70 and preferably in the range 0.10≤RSc/OD≤1.60 with respect to the tire outer diameter OD (mm). The radius of curvature RSc (mm) of the arc is in the range 25≤RSc≤330 and preferably in the range 30≤RSc≤300. As a result, the radius of curvature of the side profile is properly set and the load capacity of the tire side portion is appropriately ensured. Specifically, the lower limit reduces the amount of deflection of the tire side portion during rolling of the tire and reduces the rolling resistance of the tire. The upper limit suppresses stress concentration caused by the tire side portion becoming flat and improves durability performance of the tire. In particular, in the small-diameter tire, since large stress tends to act on the tire side portion due to the use under the high internal pressure and the high load described above, there is also a problem that side cut resistance performance of the tire should be ensured. In this regard, the lower limit ensures the radius of curvature of the side profile, suppresses a collapse of the tire by carcass tension being properly set, and suppresses side cut of the tire. The upper limit suppresses the side cut of the tire caused by an excessive tension of the carcass layer 13.

The radius of curvature RSc (mm) of the arc is in the range 0.50≤RSc/SH≤0.95 and preferably in the range 0.55≤RSc/SH≤0.90 with respect to the tire cross-sectional height SH (mm).

The radius of curvature RSc (mm) of the arc preferably satisfies the following mathematical formula (10) with respect to the tire outer diameter OD (mm) and the rim diameter RD (mm). Here, J min=15 and J max=360, preferably J min=20 and J max=330, and more preferably J min=25 and J max=300.

Mathematical Formula 10

$$J\min*(OD/RD)\wedge(1/2)\leq RSc\leq J\max+(OD/D)\wedge(1/2) \quad (10)$$

In FIG. 6, a point Be on the body portion 131 of the carcass layer 13 at the same position as the tire maximum width position Ac in the tire radial direction is defined. A point Bu' on the body portion 131 of the carcass layer 13 at a radial position of 70% of the above-described distance Hu from the tire maximum width position Ac is defined. A point Bl' on the body portion 131 of the carcass layer 13 at a radial position of 70% of the above-described distance Hl from the tire maximum width position Ac is defined.

At this time, the radius of curvature RSc (mm) of the arc passing through the tire maximum width position Ac, the point Au' and the point Al' described above is in the range 1.10≤RSc/RcC≤4.00 and preferably in the range 1.50≤RSc/RcC≤3.50 with respect to the radius of curvature RcC (mm) of the arc passing through the point Bc, the point Bu' and the point Bl'. The radius of curvature RcC (mm) of the arc passing through the point Bc, the point Bu' and the point Bl' is in the range 5≤RcC≤300 and preferably in the range 10≤RcC≤270. Thus, the relationship between the radius of curvature RSc of the side profile of the tire and the radius of curvature RcC of the side profile of the carcass layer 13 is properly set. Specifically, the lower limit ensures the radius of curvature RcC of the carcass profile, ensures the internal volume V of the tire described later, and ensures the load capacity of the tire. The upper limit ensures the total gauges Gu and Gl of the tire side portion described later and ensures the load capacity of the tire side portion.

The radius of curvature RSc (mm) of the side profile described above preferably satisfies the following mathematical formula (11) with respect to the radius of curvature RcC (mm) of the carcass profile and the tire outer diameter OD (mm). Here, K min=1 and K max=130, preferably K min=2 and K max=100, and more preferably K min=3 and K max=70.

Mathematical Formula 11

$$K\min*(OD/RSc)\wedge(1/2)\leq RCc\leq K\max*(OD/RSc)\wedge(1/2) \quad (11)$$

In FIG. 6, the total gauge Gu (mm) of the tire side portion at the above-described point Au is in the range 0.010≤Gu/OD≤0.080 and preferably in the range 0.017≤Gu/OD≤0.070 with respect to the tire outer diameter OD (mm). Accordingly, the total gauge Gu in the region on the outer side of the tire side portion in the radial direction is properly set. Specifically, the lower limit ensures the total gauge Gu in the region on the outer side of the tire side portion in the radial direction, suppresses the tire deformation during use under a high load, and ensures the wear resistance performance of the tire. In particular, since the small-diameter tire is assumed to be used under a high internal pressure and a high load, the above-described reduction effect of the rolling resistance of the tire is significant obtained. The upper limit suppresses the deterioration of the rolling resistance of the tire caused by the total gauge Gu being excessive.

The total gauge of the tire side portion is measured as a distance from the side profile to the tire inner surface on a perpendicular line drawn from a predetermined point on the side profile to the body portion 131 of the carcass layer 13.

In FIG. 6, the total gauge Gu (mm) at the above-described point Au is in the range $1.30 \leq Gu/Gc \leq 5.00$ and preferably the ratio Gu/Gc is in the range $1.90 \leq Gu/Gc \leq 3.00$ with respect to the total gauge Gc (mm) of the tire side portion at the tire maximum width position Ac. Accordingly, the gauge distribution of the tire side portion from the tire maximum width position Ac to the innermost layer of the belt layer 14 is properly set. Specifically, the lower limit ensures the total gauge Gu in the region on the outer side in the radial direction, suppresses the tire deformation during use under a high load, and ensures the wear resistance performance of the tire. The upper limit suppresses the deterioration of the rolling resistance of the tire caused by the total gauge Gu being excessive.

The total gauge Gu (mm) at the above-described point Au preferably satisfies the following mathematical formula (12) with respect to the total gauge Gc (mm) at the tire maximum width position Ac and the tire outer diameter OD (mm). Here, L min=0.10 and L max=0.70, preferably L min=0.14 and L max=0.70, and more preferably L min=0.19 and L max=0.70.

Mathematical Formula 12

$$L\min * (OD) \wedge (1/3) * Gc \leq Gu \leq L\max * (OD) \wedge (1/3) * Gc \quad (12)$$

In FIG. 6, the total gauge Gc (mm) of the tire side portion at the tire maximum width position Ac has the relationship $0.003 \leq Gc/OD \leq 0.060$ with respect to the tire outer diameter OD (mm) and preferably has the relationship $0.004 \leq Gc/OD \leq 0.050$. The lower limit ensures the total gauge Gc at the tire maximum width position Ac and ensures the load capacity of the tire. The upper limit ensures the reduction effect of the rolling resistance of the tire by reducing the total gauge Gc at the tire maximum width position Ac.

The total gauge Gc (mm) at the tire maximum width position Ac preferably satisfies the following mathematical formula (13) with respect to the tire outer diameter OD (mm). Here, M min=70 and M max=450 and preferably M min=80 and M max=400.

Mathematical Formula 13

$$M\min / (OD) \wedge (1/2) \leq Gc \leq M\max / (OD) \wedge (1/2) \quad (13)$$

The total gauge Gc (mm) at the tire maximum width position Ac preferably satisfies the following mathematical formula (14) with respect to the tire outer diameter OD (mm) and the total tire width SW (mm). Here, N min=0.20 and N max=15, preferably N min=0.40 and N max=15, and more preferably N min=0.60 and N max=12.

Mathematical Formula 14

$$N\min * (OD/SW) \leq Gc \leq N\max * (OD/SW) \quad (14)$$

The total gauge Gc (mm) at the tire maximum width position Ac preferably satisfies the following mathematical formula (15) with respect to the radius of curvature RSc (mm) of the arc passing through the tire maximum width position Ac, the point Au', and the point Al' described above. Here, O min=13 and O max=260 and preferably O min=20 and O max=200.

Mathematical Formula 15

$$O\min / (RSc) \wedge (1/2) \leq Gc \leq O\max / (RSc) \wedge (1/2) \quad (15)$$

In FIG. 6, the total gauge Gl (mm) of the tire side portion at the above-described point Al is in the range $0.010 \leq Gl/OD \leq 0.150$ and preferably in the range $0.015 \leq Gl/OD \leq 0.100$ with respect to the tire outer diameter OD. Accordingly, the total gauge Gl in the region on the inner side of the tire side portion in the radial direction is properly set. Specifically, the lower limit ensures the total gauge Gl in the region on the inner side of the tire side portion in the radial direction, suppresses the tire deformation during use under a high load, and ensures the wear resistance performance of the tire. In particular, since the small-diameter tire is assumed to be used under a high internal pressure and a high load, the above-described reduction effect of the rolling resistance of the tire is significant obtained. The upper limit suppresses the deterioration of the rolling resistance of the tire caused by the total gauge Gl being excessive.

In FIG. 6, the ratio Gl/Gc of the total gauge Gl (mm) of the tire side portion at the point Al to the total gauge Gc (mm) of the tire side portion at the tire maximum width position Ac is in the range $1.00 \leq Gl/Gc \leq 7.00$ and preferably the ratio Gu/Gc is in the range $2.00 \leq Gl/Gc \leq 5.00$. Accordingly, the gauge distribution of the tire side portion from the tire maximum width position Ac to the bead core 11 is properly set. Specifically, the lower limit ensures the total gauge Gu in the region on the inner side in the radial direction, suppresses the tire deformation during use under a high load, and ensures the wear resistance performance of the tire. The upper limit suppresses the deterioration of the rolling resistance of the tire caused by the total gauge Gl being excessive.

The total gauge Gl (mm) of the tire side portion at the above-described point Al preferably satisfies the following mathematical formula (16) with respect to the total gauge Gc (mm) at the tire maximum width position Ac and the tire outer diameter OD (mm). Here. P min=0.12 and P max=1.00, preferably P min=0.15 and P max=1.00, and more preferably P min=0.18 and P max=1.00.

Mathematical Formula 16

$$P\min * (OD) \wedge (1/3) * Gc \leq Gl \leq P\max * (OD) \wedge (1/3) * Gc \quad (16)$$

In FIG. 6, the total gauge Gl (mm) at the point Al described above is in the range $0.80 \leq Gl/Gu \leq 5.00$ and preferably in the range $1.00 \leq Gl/Gu \leq 4.00$ with respect to the total gauge Gu (mm) at the point Au described above. Accordingly, the ratio between the total gauge Gl in the region on the outer side in the radial direction and the total gauge Gu in the region on the inner side in the radial direction of the tire side portion is properly set.

The total gauge Gl (mm) at the above-described point Al preferably satisfies the following mathematical formula (17) with respect to the total gauge Gu (mm) at the above-described point Au and the tire outer diameter OD (mm). Here, Q min=0.09 and Q max=0.80, preferably Q min=0.10 and Q max=0.70, and more preferably Q min=0.11 and Q max=0.50.

Mathematical Formula 17

$$Q\min*(OD)\wedge(1/3)*Gu \le Gl \le Q\max*(OD)\wedge(1/3)*Gu \qquad (17)$$

In FIG. 6, an average rubber hardness Hsc at the measurement position of the total gauge Gc, an average rubber hardness Hsu at the measurement position of the total gauge Gu, and an average rubber hardness Hsl at the measurement point position of the total gauge Gl have the relationship Hsc≤Hsu<Hsl, preferably have the relationship 1≤Hsu−Hsc≤18 and 2≤Hsl−Hsu≤27, and more preferably have the relationship 2≤Hsu−Hsc≤15 and S≤Hsl−Hsu≤23. Accordingly, the relationship between the rubber hardnesses of the side portion is properly set.

The average rubber hardnesses Hsc, Hsu, Hsl are calculated as the sum of values obtained by dividing the product of the cross-sectional lengths and the rubber hardnesses of the respective rubber members at the respective measurement points of the total gauge Gc (mm) at the tire maximum width position Ac, the total gauge Gu at the point Au, and the total gauge Gl at the point Al by the total gauge.

In FIG. 7, a distance ΔAu' (mm) from the tire maximum width position Ac to the point Au' in the tire widthwise direction is in the range 0.03≤ΔAu'/(Hu×0.70)≤0.23 and preferably in the range 0.07≤ΔAu'/(Hu×0.70)≤0.17 with respect to 70% of the distance Hu (mm) from the tire maximum width position Ac described above. Thus, a degree of curvature of the side profile in the region on the outer side in the radial direction is properly set. Specifically, the lower limit suppresses stress concentration caused by the flat tire side portion and improves the durability performance of the tire. The upper limit reduces the amount of deflection of the tire side portion during rolling of the tire and reduces the rolling resistance of the tire. In particular, in the small-diameter tire, since large stress tends to act on the tire side portion due to the use under the high internal pressure and the high load described above, there is also a problem that side cut resistance performance of the tire should be ensured. In this regard, the lower limit ensures the radius of curvature of the side profile, suppresses a collapse of the tire by carcass tension being properly set, and suppresses side cut of the tire. The upper limit suppresses the side cut of the tire caused by an excessive tension of the carcass layer 13.

The distance ΔAl' (mm) from the tire maximum width position Ac to the point Al' in the tire width direction is in the range 0.03≤ΔAl'/(Hl×0.70)≤0.28 and preferably in the range 0.07≤ΔAl'/(Hl×0.70)≤0.20 with respect to 70% of the distance Hl (mm) from the tire maximum width position Ac. Thus, the degree of curvature of the side profile in the region on the inner side in the radial direction is properly set. Specifically, the lower limit suppresses stress concentration caused by the flat tire side portion and improves the durability performance of the tire. In particular, in the small-diameter tire, since the bead core 11 is reinforced as described above, the stress concentration at and near the bead core 11 is effectively suppressed. The upper limit reduces the amount of deflection of the tire side portion during rolling of the tire and reduces the rolling resistance of the tire.

The distances ΔAu' and ΔAl' are measured when the tire is mounted on a specified rim, inflated to a specified internal pressure, and in an unloaded state.

The distance ΔAu' (mm) from the tire maximum width position Ac to the point Au' in the tire width direction preferably satisfies the following mathematical formula (18) with respect to the radius of curvature RSc (mm) of the arc passing through the tire maximum width position Ac, the point Au', and the point Al' described above. Here, R min=0.05 and R max=5.00 and preferably R min=0.10 and R max=4.50.

Mathematical Formula 18

$$R\min*(RSc)\wedge(1/2) \le \Delta Au' \le R\max*(RSc)\wedge(1/2) \qquad (18)$$

In FIG. 7, a distance ΔBu' (mm) from the point Bc to the point Bu' in the tire width direction is in the range 1.10≤ΔBu'/ΔAu'≤8.00 and preferably in the range 1.60≤ΔBu'/ΔAu'≤7.50 with respect to the distance ΔAu' (mm) from the tire maximum width position to the point Au' in the tire width direction. Thus, the relationship between the degree of curvature of the side profile and the degree of curvature of the carcass profile in the region on the outer side in the radial direction is properly set. Specifically, the lower limit ensures the cut resistance performance of the tire side portion. The upper limit ensures the tension of the carcass layer 13, ensures the rigidity of the tire side portion, and ensures the load capacity and the durability performance of the tire.

In FIG. 7, a distance ΔBl' (mm) from the point Bc to the point Bl' in the tire width direction is in the range 1.80≤ΔBl'/ΔAl'≤11.0 and preferably in the range 2.30≤ΔBl'/ΔAl'≤9.50 with respect to the distance ΔAl' (mm) from the tire maximum width position Ac to the point Al' in the tire width direction. Thus, the relationship between the degree of curvature of the side profile and the degree of curvature of the carcass profile in the region on the inner side in the radial direction is properly set. Specifically, the lower limit ensures the total gauge Gl of the tire side portion and ensures the load capacity of the tire side portion. The upper limit ensures the tension of the carcass layer 13, ensures the rigidity of the tire side portion, and ensures the load capacity and the durability performance of the tire.

The distances ΔBu', ΔBl' are measured when the tire is mounted on a specified rim, inflated to a specified internal pressure, and in an unloaded state.

The distance ΔBu' (mm) from the point Bc to the point Bu' in the tire width direction preferably satisfies the following mathematical formula (19) with respect to the radius of curvature RcC (mm) of the arc passing through the point Bc, the point Bu', and the point Bl' described above. Here, S min=0.40 and S max=7.0 and preferably S min=0.50 and S max=6.0.

Mathematical Formula 19

$$S\min*(RSc)\wedge(1/2) \le \Delta Bu' \le S\max*(RSc)\wedge(1/2) \qquad (19)$$

In FIG. 7, a rubber gauge Gcr (mm) of the sidewall rubber 16 at the tire maximum width position Ac is in the range 0.40≤Gcr/Gc≤0.90 with respect to the total gauge Gc (mm)

at the tire maximum width position Ac described above. The rubber gauge Gcr (mm) of the sidewall rubber 16 is in the range 1.5≤Gcr and preferably in the range 2.5≤Gcr. The lower limit ensures the rubber gauge Gcr (mm) of the sidewall rubber 16 and ensures the load capacity of the sidewall portion.

The rubber gauge Gcr (mm) of the sidewall rubber 16 at the tire maximum width position Ac preferably satisfies the following mathematical formula (20) with respect to the total gauge Gc (mm) at the tire maximum width position Ac and the tire outer diameter OD (mm) described above. Here, T min=80 and T max=0.90 and preferably T min=120 and T max=0.90.

Mathematical Formula 20

$$Gc*(T\min/OD) \le Gcr \le Gc*T\max \qquad (20)$$

In FIG. 7, a rubber gauge Gin (mm) (not illustrated) of the innerliner 18 at the tire maximum width position Ac is in the range 0.03≤Gin/Gc≤0.50 and preferably in the range 0.05≤Gin/Gc≤0.40 with respect to the total gauge Gc (mm) at the tire maximum width position Ac. As a result, the inner surface of the carcass layer 13 is appropriately protected.

As described above, the tire 1 includes the pair of bead cores 11, 11, the carcass layer 13 extended across the pair of bead cores 11, 11, and the belt layer 14 disposed on the outer side of the carcass layer 13 in the radial direction (see FIG. 1). The tire outer diameter OD (mm) is in a range 200≤OD≤660. The total tire width SW (mm) is in a range 100≤SW≤400. A tensile strength Tcs (N/50 mm) per a width of 50 mm of a carcass ply constituting the carcass layer (13) is in a range 17≤Tcs/OD≤120 with respect to the tire outer diameter OD (mm).

In such a configuration, since the load capacity of the carcass layer 13 is appropriately ensured in the small-diameter tire, there is an advantage of providing the wear resistance performance and the low rolling resistance performance of the tire in a compatible manner. Specifically, the lower limit of the ratio Tcs/OD suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit of the ratio Tcs/OD suppresses the deterioration of the rolling resistance caused by the increase in the weight of the carcass layer.

In the tire 1, the carcass ply of the carcass layer 13 is configured by covering, with a coating rubber, the carcass cords made of steel. The cord diameter φcs (mm) of the carcass cord is in the range 0.3≤φcs≤1.1 and the number of insertions Ecs (piece/50 mm) of the carcass cords is in the range 25≤Ecs≤80. As a result, there is an advantage that the above-described tensile strength Tcs of the carcass layer 13 is achieved.

In the tire 1, the carcass ply of the carcass layer 13 is configured by covering, with a coating rubber, the carcass cords made of organic fiber. The cord diameter φcs (mm) of the carcass cord is in the range 0.6≤φcs≤0.9 and the number of insertions Ecs (piece/50 mm) of the carcass cords is in the range 40≤Ecs≤70. As a result, there is an advantage that the above-described tensile strength Tcs of the carcass layer 13 is achieved.

In the tire 1, the carcass layer 13 includes the body portion 131 extending along the tire inner surface and the turned-up portion 132 turned up outer side in the tire width direction so as to wrap around the bead cores 11 and extends in the tire radial direction (see FIG. 1). The radial height Hcs (mm) from the measurement point of the rim diameter RD to the end portion of the turned-up portion 132 of the carcass layer 13 is in the range 0.49≤Hcs/SH≤0.80 with respect to the tire cross-sectional height SH (mm) (see FIG. 2). Thus, there is an advantage that the radial height Hcs of the turned-up portion 132 of the carcass layer 13 is made appropriate. Specifically, the lower limit ensures the load capacity of the tire side portion, and the upper limit suppresses the deterioration of the rolling resistance caused by the increase in the weight of the carcass layer.

Additionally, in the tire 1, the contact height Hcs' (mm) of the body portion 131 and the turned-up portion 132 of the carcass layer 13 is in the range 0.07≤Hcs'/SH with respect to the tire cross-sectional height SH (mm) (see FIG. 2). This has an advantage that the load capacity of the tire side portion is effectively enhanced.

In the tire 1, the distance Tsh in the tire ground contact edge T is in the range 1.50≤Tsh/Tu≤6.90 with respect to the rubber gauge Tu (mm) from the end portion of the wide cross belt 141 to the outer circumferential surface of the carcass layer 13 (see FIG. 5). Accordingly, it is advantageous that the profile of the carcass layer 13 is properly set and tension of the carcass layer 13 is properly set.

In the tire 1, the distance ΔBu' (mm) from the point Be to the point Bu' in the tire width direction is in the range 1.10≤ΔBu'/ΔAu'≤8.00 with respect to the distance ΔAu' (mm) from the tire maximum width position Ac to the point Au' in the tire width direction (see FIG. 7). Accordingly, there is an advantage that the relationship between the degree of curvature of the side profile and the degree of curvature of the carcass profile in the region on the outer side in the radial direction is properly set. Specifically, the lower limit ensures the cut resistance performance of the tire side portion. The upper limit ensures the tension of the carcass layer 13, ensures the rigidity of the tire side portion, and ensures the load capacity and the durability performance of the tire.

In addition, in the tire 1, the distance ΔBl' (mm) from the point Bc to the point Bl' in the tire width direction is in the range 1.80≤ΔBl'/ΔAl'≤11.0 with respect to the distance ΔAl' (mm) from the tire maximum width position Ac to the point Al' in the tire width direction (see FIG. 7). Accordingly, there is an advantage that the relationship between the degree of curvature of the side profile and the degree of curvature of the carcass profile in the region on the inner side in the radial direction is properly set. Specifically, the lower limit ensures the total gauge Gl of the tire side portion and ensures the load capacity of the tire side portion. The upper limit ensures the radius of curvature RcC of the carcass profile, ensures the internal volume V of the tire, and ensures the load capacity of the tire.

In addition, in the tire 1, the amount of depression DA (mm) of the tread profile at the tire ground contact edge T has the relationship 0.008≤DA/TW≤0.060 with respect to the tire ground contact width TW (mm) (see FIG. 4). As a result, there is an advantage that the depression angle (defined by the ratio DA/(TW/2)) of the tread portion shoulder region is properly set and the load capacity of the tread portion is appropriately ensured. Specifically, the lower limit ensures the depression angle of the tread portion shoulder region and suppresses a decrease in wear life caused by an excessive ground contact pressure of the tread portion shoulder region. The upper limit flattens the tire ground contact region, uniforms the ground contact pressure, and ensures the wear resistance performance of the tire. In particular, since the small-diameter tire is assumed to be used under a high internal pressure and a high load, the ground contact pressure distribution in the tire ground contact region can be effectively properly set by the configuration.

In the tire 1, the belt layer 14 includes the pair of cross belts 141, 142 formed by belt cords made of steel covered with a coating rubber (see FIG. 1). Further, the tensile strength Tbt (N/50 mm) per the width of 50 mm of each of the pair of cross belts 141, 142 is in the range 25≤Tbt/OD≤250 with respect to the tire outer diameter OD (mm). As a result, there is an advantage that the load capacity of the cross belts 141, 142 is appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the cross belt.

Further, in the tire 1, the tensile strength Tbd (N) of one bead core 11 is in the range 45≤Tbd/OD≤120 with respect to the tire outer diameter OD (mm). As a result, there is an advantage that the load capacity of the bead core 11 is appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the bead core.

In the tire 1, the bead core 11 is constituted by the bead wire made of steel. The total cross-sectional area σbd (mm2) of the bead wire is in the range 0.025≤σbd/OD≤0.075 with respect to the tire outer diameter OD (mm). Thereby, there is an advantage that the above-described tensile strength Tbd (N) of the bead core 11 is achieved.

Tread Surface

Figure 8:
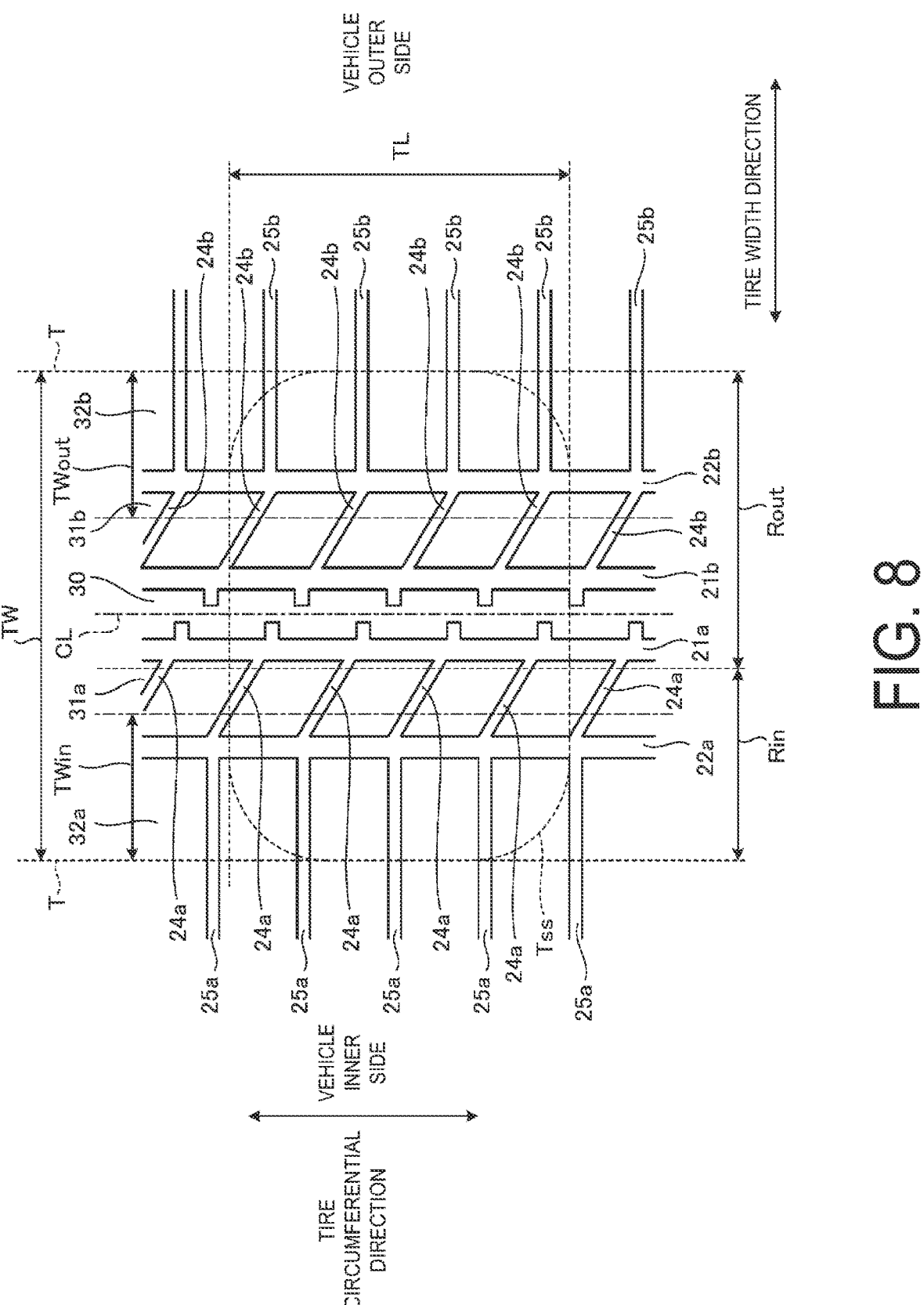
FIG. 8 is a diagram illustrating an example of a tread surface of the tread portion.

FIG. 8 is a diagram illustrating an example of the tread surface of the tread portion. As illustrated in FIG. 8, the tread portion includes the circumferential main grooves 21*a*, 21*b*, 22*a*, and 22*b* that extend in the tire circumferential direction. A plurality of land portions 30, 31*a*, 31*b*, 32*a*, 32*b* are defined and formed by these four circumferential main grooves 21*a*, 21*b*, 22*a*, and 22*b*. The tread portion has lateral grooves 24*a*, 24*b*, 25*a*, 25*b*. The lateral groove 24*a* extends in the tire circumferential direction and the tire width direction and connects the circumferential main grooves 21*a* and 22*a*. The lateral groove 24*b* extends in the tire circumferential direction and the tire width direction and connects the circumferential main grooves 21*b* and 22*b*. The lateral groove 25*a* extends in the outer side in the tire width direction from the circumferential main groove 22*a* and reaches the outer side of the ground contact edge T. The lateral groove 25*b* extends from the circumferential main groove 22*b* in the outer side in the tire width direction and reaches the outer side of the ground contact edge T. The reference sign Tss denotes a tire ground contact region in FIG. 8. In the ground contact region Tss, a tire ground contact width is indicated by a reference sign TW (mm), and a tire ground contact length is indicated by a reference sign TL.

In FIG. 8, a region of $48 \times (OD/SW)^{(1/5)}$ (%) from a maximum ground contact width end portion on the tire inner side when the tire is mounted on a vehicle is defined as a tire inner region of the tread portion. A region other than the tire inner region is defined as a tire outer region.

Groove Area Ratio

In the tire 1 having the tread surface illustrated in FIG. 8, it is preferable that the tire outer diameter OD (mm) is in the range 200≤OD≤660, the total tire width SW (mm) is in the range 100≤SW≤400, the groove area ratio Aa (%) of the tread portion is in the range 0.008≤Aa/OD≤0.150, and further the groove area ratio Ai (%) of the tire inner region and the groove area ratio Ao (%) of the tire outer region as the region other than the tire inner region have the relationship Ai<Ao. By satisfying these relationships, a floor of a vehicle can be lowered by reducing the outer diameter, and a space in the vehicle can be widened. Further, since rotational inertia can be reduced and a weight can be reduced, fuel economy is greatly improved. The relationship of the groove area ratio Ai<Ao on the assumption that the tire inner region and the tire outer region are defined as described above means that the groove area ratio Ao of the tire outer region, which greatly contributes to drainage when cornering, is made larger than the groove area ratio Ai of the tire inner region. Rolling resistance and rotational inertia can be reduced and fuel economy performance can be further improved by widening the tire outer region having the large groove area ratio. When the total width SW is large, the ground contact length becomes short, and wet performance tends to be disadvantageous. In this case, deterioration of wet performance can be effectively prevented and fuel economy performance can be improved by micrifying the tire inner region and widening the tire outer region having the large groove area ratio. When the tire outer diameter OD is small, deterioration of wet performance can be effectively prevented and fuel economy performance can be improved by micrifying the tire inner region and widening the tire outer region having the large groove area ratio. Further, by setting the relationship between the groove area ratio Aa having a large effect on wet performance and the outer diameter OD having a large effect on fuel economy performance within an appropriate range 0.008≤Aa/OD≤0.150, wet performance and fuel economy performance can be provided in a compatible manner.

The groove area ratio is a ratio between the sum of the groove areas disposed in a predetermined region of the tread portion and the area of the region. The groove area ratio is defined as: groove area/(groove area+ground contact area). "Groove area" refers to the opening area of the grooves at the ground contact surface. Moreover, a groove refers to a circumferential groove, a narrow groove, or a lateral groove (lug groove) in the tread portion, and does not include sipes or kerfs. "Ground contact area" refers to the contact area between the tire and the ground contact surface. Additionally, the groove area and the ground contact area are measured at a contact surface between a tire and a flat plate when the tire is mounted on a specified rim, inflated to the specified internal pressure (230 kPa), placed vertically on the flat plate in a static state, and applied with a load corresponding to the specified load (a load 80% of the maximum load capacity).

In the present tire, a sound absorptive member can be mounted as a measure against noise in consideration of use in a moving conference room or the like, or a sensor, a sealant, or a thermoplastic resin innerliner can be mounted for the purpose of maintenance free assuming use in a vehicle dedicated for transport. Mounting the present tires on a vehicle equipped with a monitoring system brings a large effect. In use at a high internal pressure, the tread wear reaches its limit before the endurance limit of the tire side portion and the belt portion, and therefore the tire is suitable for use in retread.

A groove area ratio Ai30 in a region TWin from the ground contact edge T on the tire inner side to 30% of the ground contact width TW is preferably in the range $0 \leq Ai30 \leq 40$, and a groove area ratio Ao30 in a region TWout from the ground contact edge T on the tire outer side to 30% of the ground contact width TW is preferably in the range $5 \leq Ao30 \leq 50$. The groove area ratio Ai30 and the groove area ratio Ao30 within these ranges allow providing improved wet performance and fuel economy performance. Note that the region TWin from the ground contact edge T on the tire inner side to 30% of the ground contact width TW is necessarily a region on the tire inner side. The region TWout, which is the region from the ground contact edge T on the tire outer side to 30% of the ground contact width TW, is necessarily a region on the tire outer side.

A ratio Ao30/Ai30 of the groove area ratio Ai30 to the groove area ratio Ao30 is preferably in the range $0.1 \leq Ai30/Ao30 \leq 1$. The ratio Ai30/Ao30 within this range allows providing improved wet performance and fuel economy performance.

A maximum groove depth G max (mm) of the entire tread portion preferably satisfies $0.006 \leq G\ max/OD \leq 0.083$. The maximum groove depth G max within this range allows providing improved wet performance and fuel economy performance. In particular, when the outer diameter OD is large, the rotational inertia increases and the transportation cost increases. Therefore, it is preferable to deepen the groove depth and reduce the tread volume. The maximum groove depth G max in the entire tread portion more preferably satisfies $0.007 \leq G\ max/OD \leq 0.060$. The maximum groove depth G max in the entire tread portion further preferably satisfies $0.008 \leq G\ max/OD \leq 0.050$.

A ratio Ai/Ao of the groove area ratio Ai to the groove area ratio Ao preferably satisfies $0.05 \times (OD/650) < Ai/Ao < 1$. The ratio Ai/Ao within this range allows providing improved wet performance and fuel economy performance. When the outer diameter OD is small, drainage performance becomes insufficient. Therefore, it is necessary to supplement the drainage performance by increasing the groove area ratio Ao and decreasing the groove area ratio Ai of the tire inner region (increasing the difference between the groove area ratio Ai and the groove area ratio Ao). However, when the difference between the groove area ratio Ai and the groove area ratio Ao is too large, drainage performance when traveling straight decreases. Therefore, the above-described range is preferable. The ratio Ai/Ao more preferably satisfies $0.10 \times (OD/650) \leq Ai/Ao \leq 0.98$. The ratio Ai/Ao further preferably satisfies $0.15 \times (OD/650) \leq Ai/Ao \leq 0.98$.

A ratio Gi/Go of the maximum groove depth Gi (mm) of the tire inner region to the maximum groove depth Go (mm) of the tire outer region preferably satisfies $0.4 \leq Gi/Go \leq 1.6$. Within the numerical range, wet performance and fuel economy performance can be improved. When the difference between the maximum groove depth Go of the tire outer region and the maximum groove depth Gi of the tire inner region is too large, uneven wear is likely to occur. Therefore, it is preferable that the difference is within the numerical range. The ratio Gi/Go is more preferably $0.6 \leq Gi/Go \leq 1.5$, and even further preferably $0.9 \leq Gi/Go \leq 1.4$. It is preferable that both the maximum groove depths Go, Gi are the maximum groove depths of the circumferential main grooves. Even in the case where not the circumferential main groove but the lateral groove has the maximum groove depth, the groove depth is preferably within the numerical range.

As illustrated in FIG. 8, the tread portion in the present example includes the circumferential main grooves 21a, 21b, 22a, and 22b that extend in the tire circumferential direction. The circumferential main groove is assumed to have a groove width of 3 mm or more. With respect to the product of the outer diameter OD and the total width SW, a projected area C (mm²) of the circumferential main grooves preferably satisfies $0.03 \leq C/(SW \times OD) \leq 1.01$.

By defining the range of the area of the circumferential main grooves with respect to the outer diameter OD and the total width SW, wet performance and fuel economy performance can be further improved. The projected area C is the total area of the circumferential grooves for one round of the tire. As illustrated in FIG. 8, when the tread portion has a plurality of the circumferential main grooves, the total area of areas of all of the circumferential main grooves is defined as the projected area C. When the tread portion has only one circumferential main groove, the area of one circumferential main groove is defined as the projected area C. The projected area C (mm²) of the circumferential main groove more preferably satisfies $0.15 \leq C/(SW \times OD) \leq 0.94$.

An average pitch number Po (piece) (Po is a natural number) within the tire ground contact length TL in the tire outer region preferably satisfies $OD/200 \leq Po \leq OD/50$ with respect to the outer diameter OD. In the case of the pitch number in the range, when the outer diameter OD is large, the tire ground contact length TL becomes long. When the tire ground contact length TL is long, the pitch number can be increased. Therefore, by satisfying the above, drainage performance is improved. The average pitch number Po (piece) (Po is a natural number) within the tire ground contact length TL in the tire outer region more preferably satisfies $OD/150 \leq Po \leq OD/60$ with respect to the outer diameter OD. For example, when the outer diameter OD is 300 mm, the pitch number Po is preferably a natural number of 2 or more and 6 or less. When the outer diameter OD is 650 mm, the pitch number Po is preferably a natural number of 4 or more and 13 or less.

Here, in the pitches included in a rib within the tire ground contact length in the tire outer region, when the pitch number included in the rib within the ground contact length varies for each tire rotation, the average pitch number is a value obtained by averaging the varying pitch numbers. Further, when there are a plurality of ribs having the different pitch numbers, the average pitch number is obtained by averaging the pitch numbers for each rib.

A ratio Pi/Po of the average pitch number Pi (piece) within the tire ground contact length TL in the tire inner region to the average pitch number Po (piece) within the tire ground contact length TL in the tire outer region preferably satisfies $0.7 \leq Pi/Po \leq 1.5$. By satisfying the above, wet performance and fuel economy performance can be improved. The ratio Pi/Po of the average pitch number Pi (piece) within the tire ground contact length TL in the tire inner region to the average pitch number Po (piece) within the tire ground contact length TL in the tire outer region more preferably satisfies 1.0≤Pi/Po≤1.4.

EXAMPLES

FIGS. 9 to 14 are tables showing results of performance tests of tires according to embodiments of the technology.

In the performance tests, (1) wet performance and (2) fuel economy performance (fuel consumption rate) were evaluated for a plurality of types of test tires. As an example of the small-diameter tire, test tires having two types of tire sizes are used. To be specific, [A] a test tire having a tire size of 235/45R10 was mounted on a rim having a rim size of 10×8, and [B] a test tire having a tire size of 145/80R12 was mounted on a rim having a rim size of 12×4.00B.

(1) In the evaluation for wet performance, an internal pressure of 230 kPa and a load of 4.2 kN were applied to the test tire [A], and an internal pressure of 80% of the specified internal pressure of JATMA and a load of 80% of the specified load of JATMA were applied to the test tire [B]. In addition, with a four wheeled low-floor vehicle with the test tires mounted on all wheels, a sensory test on steering stability performance was conducted by a test driver on a test course in the rain. The results are expressed as index values and evaluated, with Comparative Example being assigned as the reference (100). Larger values provide excellent wet performance.

(2) In the evaluation for fuel economy performance, an internal pressure of 230 kPa and a load of 4.2 kN were applied to the test tire [ A], and an internal pressure of 80% of the specified internal pressure of JATMA and a load of 80% of the specified load of JATMA were applied to the test tire [B]. In addition, a four wheeled low-floor vehicle with the test tires mounted on all wheels traveled an entire length of 2 km on a test course. The vehicle traveled 50 rounds on the test course at a speed per hour of 100 km/h, and the fuel consumption rate (km/l) was measured. The results are expressed as index values and evaluated, with Comparative Example being assigned as the reference (100). Larger values provide excellent fuel economy performance.

The test tire of Example has the structure illustrated in FIG. 1, and includes the pair of bead cores 11, 11, the carcass layer 13 formed of a single layered carcass ply, the pair of cross belts 141, 142, the belt layer 14 formed of the belt cover 143 and the pair of belt edge covers 144, 144, the tread rubber 15, the sidewall rubber 16, and the rim cushion rubber 17.

In the test tire of Comparative Example, the tire outer diameter OD=531 mm, the total tire width SW=143 mm, and the tire ground contact width TW=123 mm in the test tire of Example 1, and the test tire is mounted on a rim having a rim size of 12.

As can be seen from the test results, the test tires of Examples provide the wet performance and the fuel economy performance of the tire in a compatible manner.

The present disclosure includes the following technologies.

Technology 1

A tire may include:
a pair of bead cores;
a carcass layer extended across the bead cores;

a belt layer disposed on an outer side of the carcass layer in a radial direction; and
a tread portion,
a tire outer diameter OD (mm) may be in a range 200≤OD≤660,
a total tire width SW (mm) may be in a range 100≤SW≤400,
a groove area ratio Aa (%) of the tread portion may be in a range 0.008≤Aa/OD≤0.150, and
when a region of 48×(OD/SW)^(1/5) (%) from a maximum ground contact width end portion on a tire inner side when the tire is mounted on a vehicle is defined as a tire inner region of the tread portion, a groove area ratio Ai (%) of the tire inner region and a groove area ratio Ao (%) of a tire outer region as a region other than the tire inner region may have a relationship Ai<Ao.

Technology 2

The tire according to technology 1, in which
a groove area ratio Ai30 in a region from a ground contact edge on a tire inner side of the tread portion to 30% of a ground contact width is in a range 0≤Ai30≤40, and
a groove area ratio Ao30 in a region from a ground contact edge on a tire outer side of the tread portion to 30% of a ground contact width is in a range 5≤Ao30≤50.

Technology 3

The tire according to technology 2, in which a ratio Ao30/Ai30 of the groove area ratio Ai30 to the groove area ratio Ao30 is in a range 0.1≤Ai30/Ao30≤1.

Technology 4

The tire according to any one of technologies 1 to 3, in which a maximum groove depth G max (mm) of the entire tread portion satisfies 0.006≤G max/OD≤0.083.

Technology 5

The tire according to any one of technologies 1 to 4, in which a ratio Ai/Ao of the groove area ratio Ai to the groove area ratio Ao satisfies 0.05×(OD/650)<Ai/Ao<1.

Technology 6

The tire according to any one of technologies 1 to 5, in which a ratio Gi/Go of a maximum groove depth Gi (mm) of the tire inner region to a maximum groove depth Go (mm) of the tire outer region satisfies 0.4≤Gi/Go≤1.6.

Technology 7

The tire according to any one of technologies 1 to 6, in which
the tread portion has a circumferential main groove extending in a tire circumferential direction,
the circumferential main groove has a groove width of 3 mm or more, and
a projected area C (mm²) of the circumferential main groove satisfies 0.03≤C/(SW×OD)≤1.01.

Technology 8

The tire according to any one of technologies 1 to 7, in which an average pitch number Po (piece) (Po is a natural number) within a tire ground contact length in the tire outer region satisfies OD/200≤Po≤OD/50 with respect to the tire outer diameter OD.

Technology 9

The tire according to any one of technologies 1 to 8, in which a ratio Pi/Po between an average pitch number Pi (piece) within a tire ground contact length in the tire inner region and an average pitch number Po (piece) in the tire ground contact length in the tire outer region satisfies 0.7≤Pi/Po≤1.5.

The invention claimed is:

1. A tire, comprising:
a pair of bead cores;
a carcass layer extended across the bead cores;
a belt layer disposed on an outer side of the carcass layer in a radial direction; and
a tread portion;
a tire outer diameter OD (mm) being in a range 200≤OD≤660,
a total tire width SW (mm) being in a range 100≤SW≤400,
a groove area ratio Aa (%) of the tread portion being in a range 0.008≤Aa/OD≤0.150,
when a region of 48×(OD/SW)^(1/5) (%) from a maximum ground contact width end portion on a tire inner side when the tire is mounted on a vehicle is defined as a tire inner region of the tread portion, a groove area ratio Ai (%) of the tire inner region and a groove area ratio Ao (%) of a tire outer region as a region other than the tire inner region have a relationship Ai<Ao, and
an average pitch number Po (piece) (Po is a natural number) within a tire ground contact length in the tire outer region satisfying OD/200≤Po≤OD/50 with respect to the tire outer diameter OD.

2. The tire according to claim 1, wherein
a groove area ratio Ai30 in a region from a ground contact edge on a tire inner side of the tread portion to 30% of a ground contact width is in a range 0≤Ai30≤40, and
a groove area ratio Ao30 in a region from a ground contact edge on a tire outer side of the tread portion to 30% of a ground contact width is in a range 5≤Ao30≤50.

3. The tire according to claim 2, wherein a ratio Ai30/Ao30 of the groove area ratio Ai30 to the groove area ratio Ao30 is in a range 0.1≤Ai30/Ao30≤1.

4. The tire according to claim 3, wherein a maximum groove depth Gmax (mm) of the entire tread portion satisfies 0.006≤Gmax/OD≤0.083.

5. The tire according to claim 4, wherein a ratio Ai/Ao of the groove area ratio Ai to the groove area ratio Ao satisfies 0.05×(OD/650)<Ai/Ao<1.

6. The tire according to claim 5, wherein a ratio Gi/Go of a maximum groove depth Gi (mm) of the tire inner region to a maximum groove depth Go (mm) of the tire outer region satisfies 0.4≤Gi/Go≤1.6.

7. The tire according to claim 6, wherein a ratio Pi/Po between an average pitch number Pi (piece) within a tire ground contact length in the tire inner region and an average pitch number Po (piece) in the tire ground contact length in the tire outer region satisfies 0.7≤Pi/Po≤1.5.

8. The tire according to claim 1, wherein a maximum groove depth Gmax (mm) of the entire tread portion satisfies 0.006≤Gmax/OD≤0.083.

9. The tire according to claim 1, wherein a ratio Ai/Ao of the groove area ratio Ai to the groove area ratio Ao satisfies 0.05×(OD/650)<Ai/Ao<1.

10. The tire according to claim 1, wherein a ratio Gi/Go of a maximum groove depth Gi (mm) of the tire inner region to a maximum groove depth Go (mm) of the tire outer region satisfies 0.4≤Gi/Go≤1.6.

11. The tire according to claim 1, wherein
the tread portion has a circumferential main groove extending in a tire circumferential direction,
the circumferential main groove has a groove width of 3 mm or more, and
a projected area C (mm²) of the circumferential main groove satisfies 0.03≤C/(SW×OD)≤1.01.

12. The tire according to claim 1, wherein a ratio Pi/Po between an average pitch number Pi (piece) within a tire ground contact length in the tire inner region and an average pitch number Po (piece) in the tire ground contact length in the tire outer region satisfies 0.7≤Pi/Po≤1.5.

13. A tire, comprising:
a pair of bead cores;
a carcass layer extended across the bead cores;
a belt layer disposed on an outer side of the carcass layer in a radial direction; and
a tread portion;
a tire outer diameter OD (mm) being in a range 200≤OD≤660,
a total tire width SW (mm) being in a range 100≤SW≤400,
a groove area ratio Aa (%) of the tread portion being in a range 0.008≤Aa/OD≤0.150, and
when a region of 48×(OD/SW)^(1/5) (%) from a maximum ground contact width end portion on a tire inner side when the tire is mounted on a vehicle is defined as a tire inner region of the tread portion, a groove area ratio Ai (%) of the tire inner region and a groove area ratio Ao (%) of a tire outer region as a region other than the tire inner region have a relationship Ai<Ao; wherein
a groove area ratio Ai30 in a region from a ground contact edge on a tire inner side of the tread portion to 30% of a ground contact width is in a range 0≤Ai30≤40,
a groove area ratio Ao30 in a region from a ground contact edge on a tire outer side of the tread portion to 30% of a ground contact width is in a range 5≤Ao30≤50,
a ratio Ai30/Ao30 of the groove area ratio Ai30 to the groove area ratio Ao30 is in a range 0.1≤Ai30/Ao30≤1,
a maximum groove depth Gmax (mm) of the entire tread portion satisfies 0.006≤Gmax/OD≤0.083,
a ratio Ai/Ao of the groove area ratio Ai to the groove area ratio Ao satisfies 0.05×(OD/650)<Ai/Ao<1,
a ratio Gi/Go of a maximum groove depth Gi (mm) of the tire inner region to a maximum groove depth Go (mm) of the tire outer region satisfies 0.4≤Gi/Go≤1.6,
the tread portion has a circumferential main groove extending in a tire circumferential direction,
the circumferential main groove has a groove width of 3 mm or more,
a projected area C (mm²) of the circumferential main groove satisfies 0.03≤C/(SW×OD)≤1.01, and
an average pitch number Po (piece) (Po is a natural number) within a tire ground contact length in the tire outer region satisfies OD/200≤Po≤OD/50 with respect to the tire outer diameter OD.

* * * * *